United States Patent
Maioli et al.

(12) 
(10) Patent No.: US 6,263,938 B1
(45) Date of Patent: Jul. 24, 2001

(54) PANEL EDGE BANDING DEVICE

(75) Inventors: Fabio Maioli, Santarcangelo di Romagna; Massimo Rosati, Pesaro; Alessandro Neri, Viserba; Enrico Trebbi, Pesaro, all of (IT)

(73) Assignee: SCM Group S.p.A., Rimini (IT)

( * ) Notice: Subject to any disclaimer, the term of this patent is extended or adjusted under 35 U.S.C. 154(b) by 0 days.

(21) Appl. No.: 09/274,848

(22) Filed: Mar. 23, 1999

(30) Foreign Application Priority Data

Mar. 24, 1998 (IT) ................................ B098A0189

(51) Int. Cl.⁷ ..................................... B32B 31/00
(52) U.S. Cl. ................ 156/447; 156/361; 156/351; 156/468; 156/486; 156/446
(58) Field of Search ..................... 156/468, 486, 156/446, 447, 361, 351

(56) References Cited

U.S. PATENT DOCUMENTS

| | | | |
|---|---|---|---|
| 2,713,437 | * 7/1955 | Broden | 156/446 |
| 3,468,741 | * 9/1969 | Miller et al. | 156/468 |
| 3,473,988 | * 10/1969 | Rullier et al. | 156/109 |
| 3,655,479 | * 4/1972 | Helmes et al. | 156/212 |
| 3,733,237 | * 5/1973 | Wolff | 156/468 |
| 4,696,714 | * 9/1987 | Voorhees | 156/468 |

FOREIGN PATENT DOCUMENTS

| | | |
|---|---|---|
| 35 17 194 | 11/1986 | (DE) . |
| 0 276 358 | 8/1988 | (EP) . |
| 0 510 231 | 10/1992 | (EP) . |
| WO97/05993 | 2/1997 | (WO) . |

* cited by examiner

Primary Examiner—Linda Gray
(74) Attorney, Agent, or Firm—Fay, Sharpe, Fagan, Minnich & McKee, LLP

(57) ABSTRACT

An edge banding device for panels includes an edge band applicator. The edge band applicator includes a motor-driven shaft that defines a vertical main axis and that mounts and drives a roller that contacts the edge of the panel. The contact roller turns freely about the vertical main axis. On opposite sides of the contact roller are located a glue feeder and at least one main pressure roller of the edge band. The glue feeder and pressure roller are adapted for oscillating about the shaft in accordance with the profile of the panel.

46 Claims, 18 Drawing Sheets

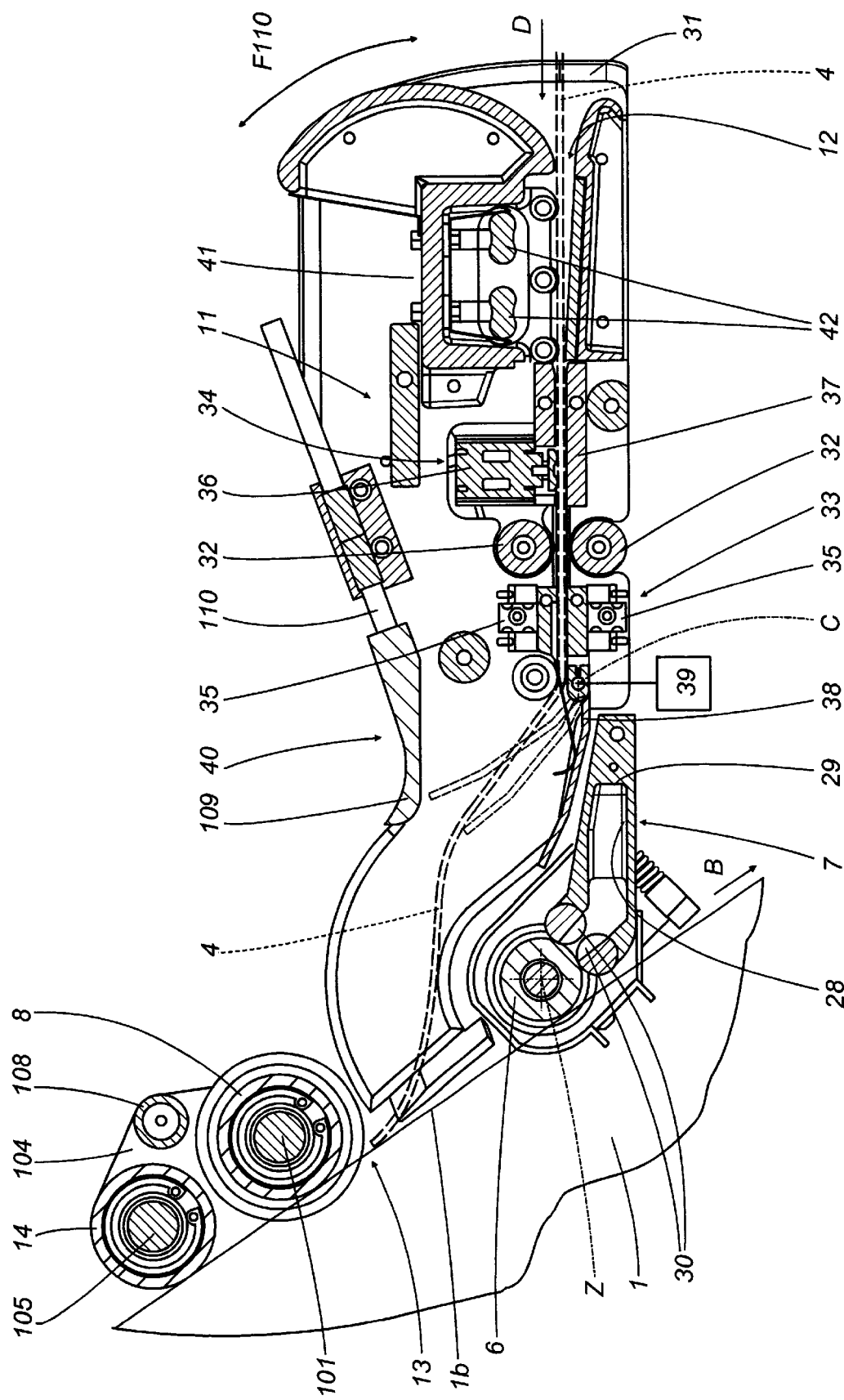

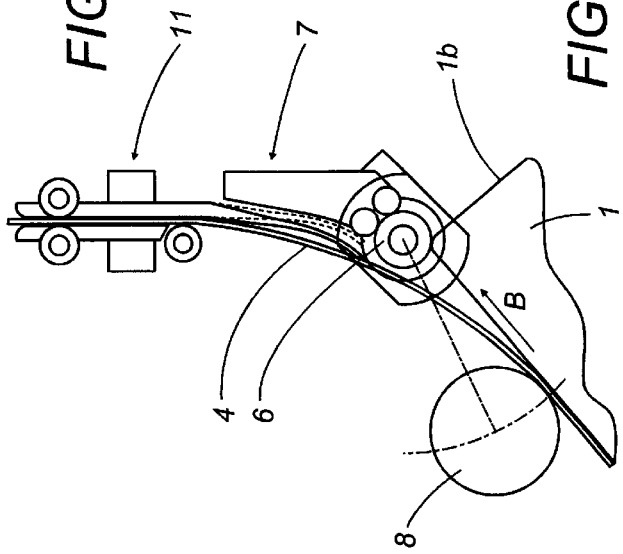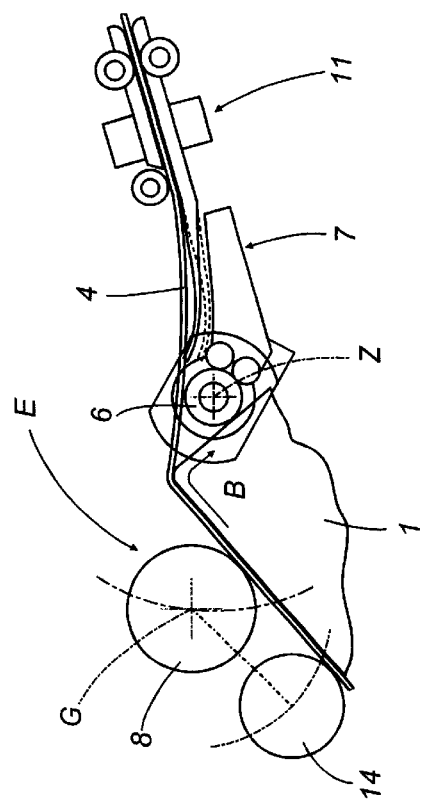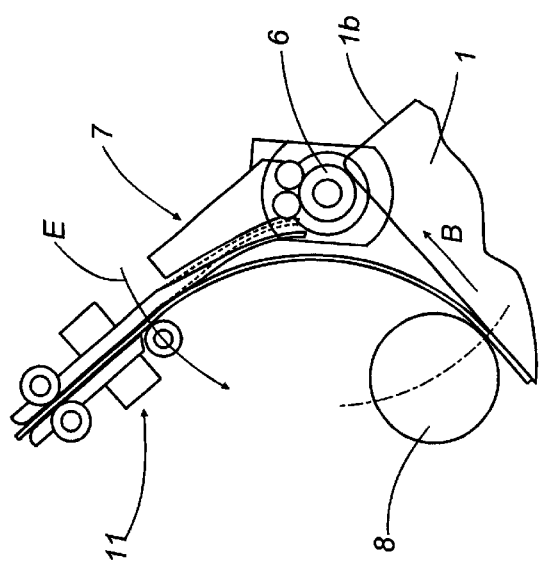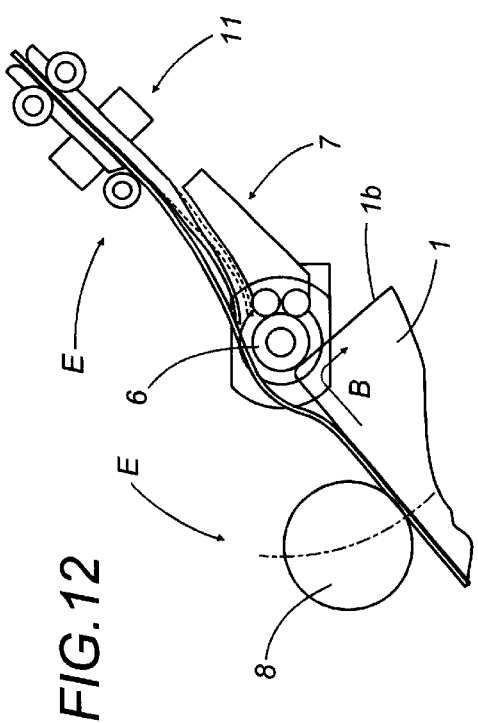

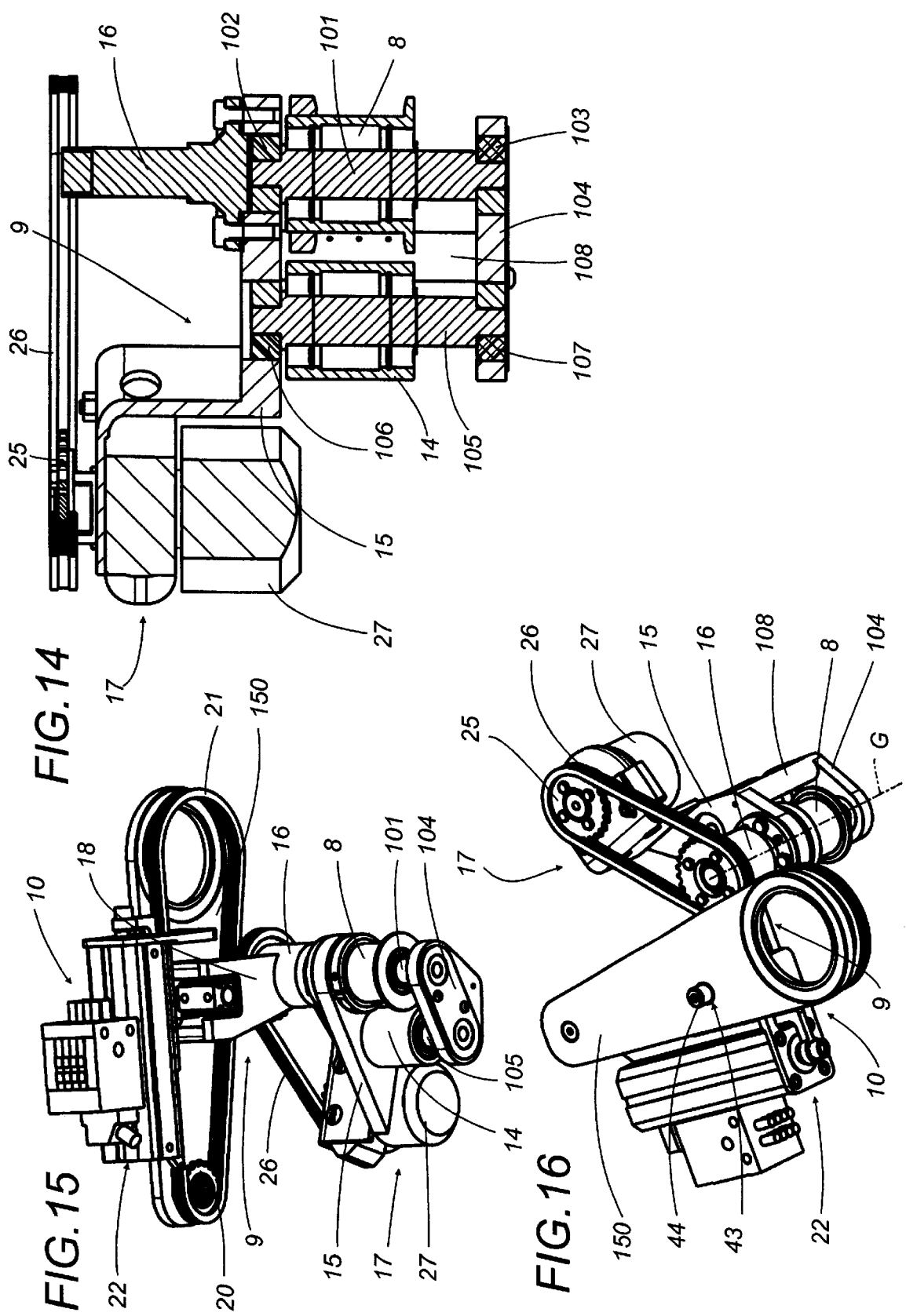

FIG.20
FIG.21
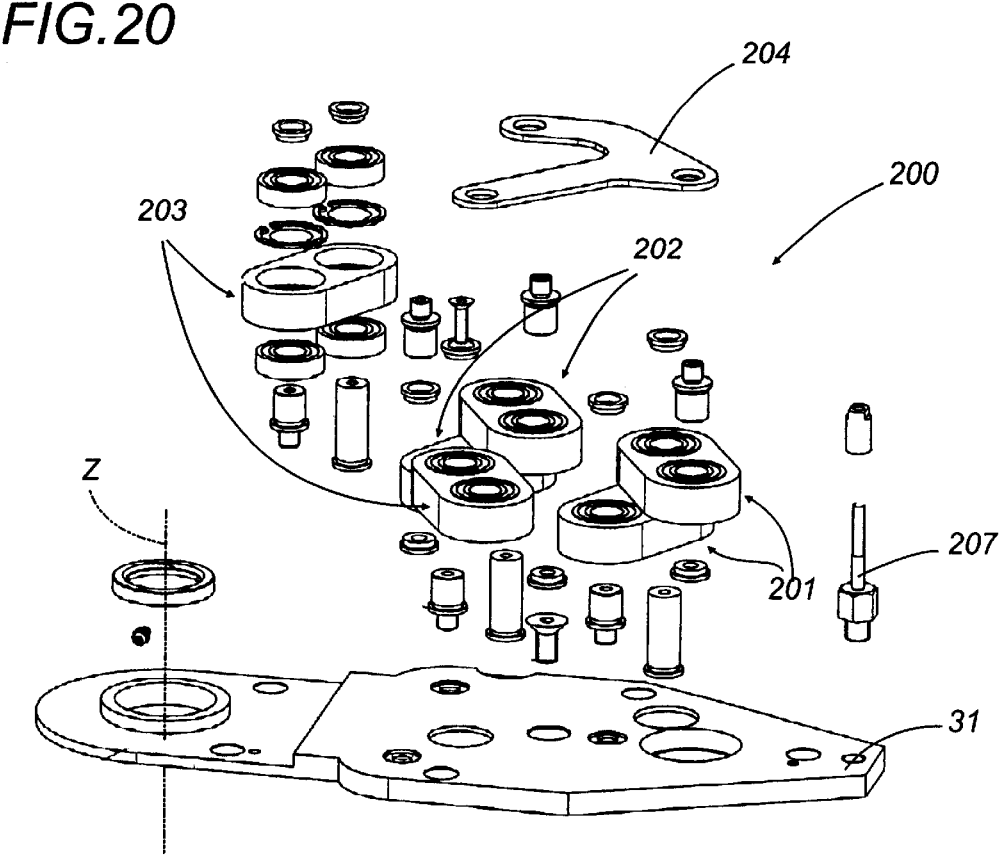
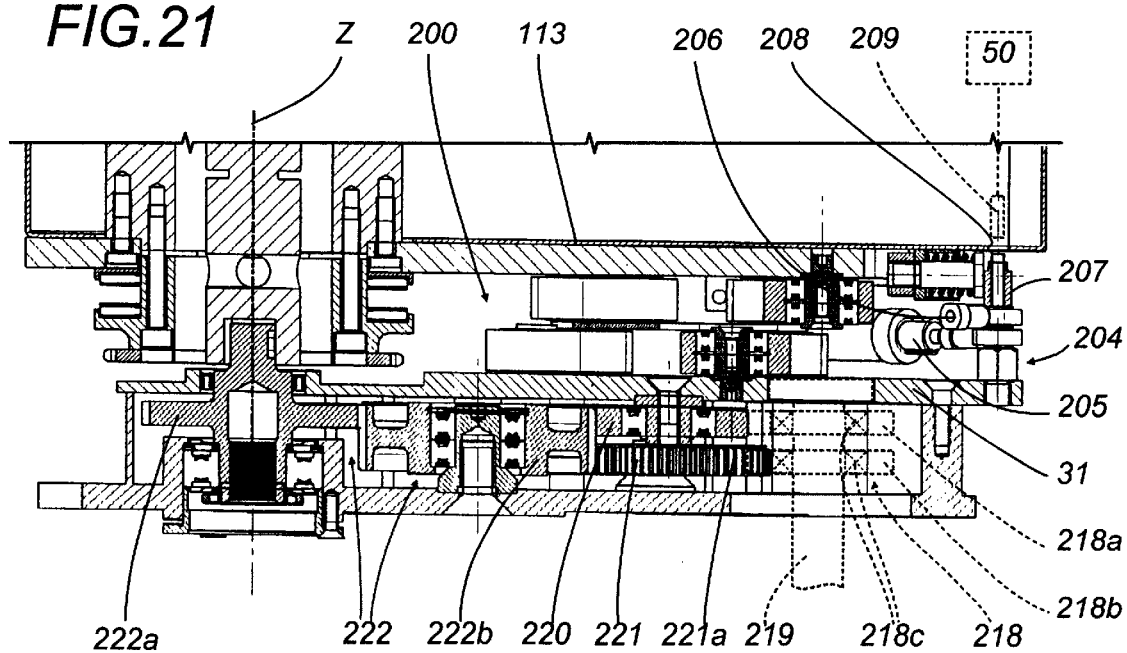

PANEL EDGE BANDING DEVICE

BACKGROUND OF THE INVENTION

The present invention relates to a device for applying edge banding to panels, especially panels of various different shapes, made of wood, plastic or similar materials and used preferably to make items of furniture.

At present, the operation by which edge banding, usually a strip of synthetic material, is glued to the edges of panels with curved profiles is carried out using equipment of various kinds, based on the different constructional principles followed by different manufacturers of woodworking machinery.

This equipment consists basically of a work table on which the panel to be edged is placed and means for applying the edging. The work table and the means for applying the edging move relative to each other so that the edging can be glued right round the perimeter of the panel.

By way of example, one solution for a piece of equipment of this kind is disclosed in German patent application DE - OS 35.17.194 in which the work table, with the panel on it, can rotate about a vertical axis, while the edge banding application means, comprising a roller that presses on the edge band while the latter is being fed, are driven only along the longitudinal axis of the machine in such a way as to copy the profile of the panel as it comes into contact with the pressure roller.

A more recent solution is disclosed in patent publications EP 276.358 and EP 510.231 which describe an apparatus that has a fixed table, to which the panel is secured, and a carriage equipped with an arm that mounts the devices for feeding the edge band, applying the edge band, machining the edge and cutting off the edge band. The carriage moves along two controlled axes X and Y above and in parallel with the surface of the panel to apply the edge band to the panel and finish the edge.

These solutions envisage the use of pre-glued edge banding which, just before being applied to the panel, is heated in such a way as to reactivate the glue. The disadvantage of this method is that, since the amount of glue forming the layer of pre-applied glue must be limited, it is not always enough to "cover" the pores in the edge of the panel. In short, machines of this kind sometimes work with "less than sufficient glue".

There are also "through" machines, that is to say, linear edge banding machines designed to apply edge bands to panels with straight edges and in which the panel is fed relative to the edge banding device, which remains fixed: with these machines, the glue may be applied either to the panel or to the edge band.

SUMMARY OF THE INVENTION

The aim of the present invention is to overcome the disadvantages mentioned above by providing a panel edge banding device that is extremely easy to use, compact, adaptable to panels of any shape, quick to install and capable of securely joining the panel edge to the edge band with glue.

BRIEF DESCRIPTION OF THE DRAWINGS

The technical characteristics of the invention according to the above mentioned aims are described in the claims below and the advantages of the invention will become more apparent from the detailed description which follows, with reference to the accompanying drawings, which illustrate preferred embodiments of the invention and in which:

FIG. 4 is a top plan view, with some parts cut away and others in cross section, of some of the working parts of the device shown in the illustrations listed above;

FIGS. 10 through 13 are schematic top plan views of a series of working configurations that can be obtained with the device disclosed on a panel with an angled profile;

FIG. 14 is a scaled-up detail of FIG. 3, viewed from "J", showing a unit consisting of two pressure rollers in a side view with some parts in cross section and others cut away;

FIGS. 15 and 16 are perspective views from below and above, respectively, and with some parts cut away in order to better illustrate others, of the twin-roller unit illustrated in FIG. 14, equipped with means for adjusting the position of the rollers;

FIG. 20 is a perspective, exploded view of a part of the device disclosed showing the means for suspending a glue unit and an edge banding feed unit;

FIG. 21 is a longitudinal section of the area where the glue unit and the edge band feed unit are suspended, also showing some parts in perspective and partly cut away in order to better illustrate others;

DESCRIPTION OF THE PREFERRED EMBODIMENTS

With reference to the accompanying drawings, described above, in particular, FIG. 1, the device disclosed herein applies edge banding to panels 1 made of wood or other wood-based material, plastic or similar material and used preferably to make items of furniture.

Figure 1:
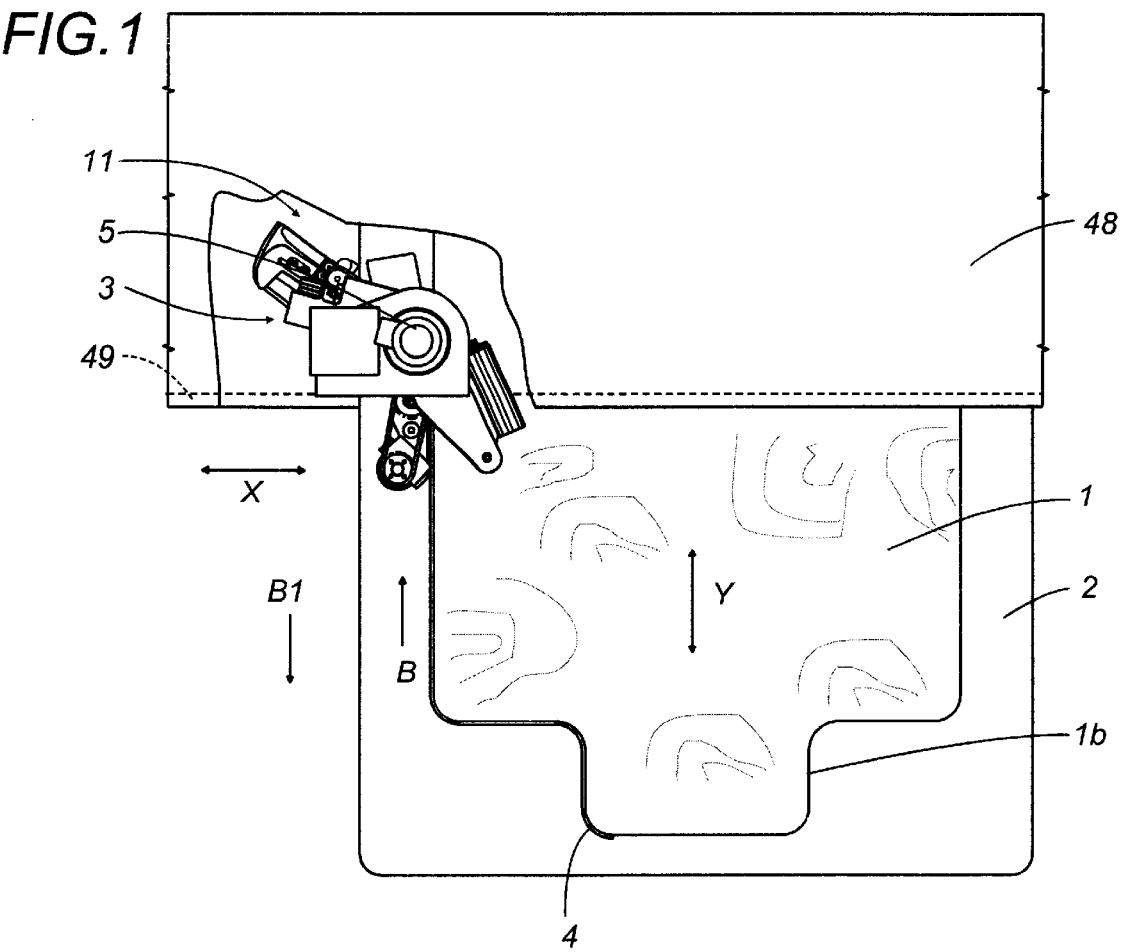
FIG. 1 shows a panel machine equipped with the edge banding device made according to the present invention, in a schematic top plan view with some parts cut away in order to better illustrate others.

As shown in FIG. 1, the edges of the panels 1 may have differently shaped profiles, for example, convex, angled or concave, and the edge banding should preferably but not necessarily be applied uninterruptedly right around the panel 1.

The panels 1 can be processed in machines whose basic structure consists of at least one work table 2 on which the panel 1 is securely held, and application means 3 for gluing an edging band 4 to an edge 1b of the panel 1 in a defined direction B. The application means 3 and the work table 2 can move relative to each other and, in FIG. 1, by way of example, they move along defined axes, the application means 3 along an axis X on a crossbar 48 equipped with a rail 49 on which the application means 3 run in both directions, while the work table 2 runs along an axis Y perpendicular to the axis X (in the case illustrated, the feed direction B is opposite to the feed direction B1 of the table 2 with the panel 1 on it).

Obviously, this machine is illustrated by way of example only and the device can be applied to other types of machines without departing from the scope of the inventive concept.

The application means 3 (see also FIGS. 2 and 3) consist of a unit with a motor-driven, tubular shaft 5, that forms a vertical main axis Z and that mounts and, through motors and appropriate drive gear (not illustrated) located inside the shaft 5, drives the following items: a contact roller 6, which, as explained in more detail below, may also be used to apply glue to the edge 1b of the panel 1, said roller 6 rotating about its vertical axis, which coincides with the main axis Z; a first main pressure roller 8 of the edge band 4 and glue feed means 7. The last two items are positioned on opposite sides of the roller 6 and can oscillate about the main axis Z in accordance with the profile of the panel 1.

The oscillation of the main roller 8 and of the glue feed means 7 may be performed in two different ways. In one (the first embodiment described below), both the elements are able to tilt and the glue feed means 7 are also able to move in such a way as to follow the profile of the panel 1.

With reference in particular to FIG. 4, in a first embodiment in which the roller 6 is also used to apply glue to the edge 1b, the surface of the roller 6 is in contact with the glue feed means 7, the glue feed means 7 consisting basically of a glue pot 28 in a housing 29 made in the unit and located near the applicator roller 6. The glue pot 28 is equipped with a pair of spreader rollers 30 which turn freely about the corresponding vertical axes and are located between the glue pot 28 and the glue applicator roller 6 so that they can uniformly spread glue on the outer surface of the roller 6 which in turn applies it to the edge 1b of the panel 1.

Figure 17:
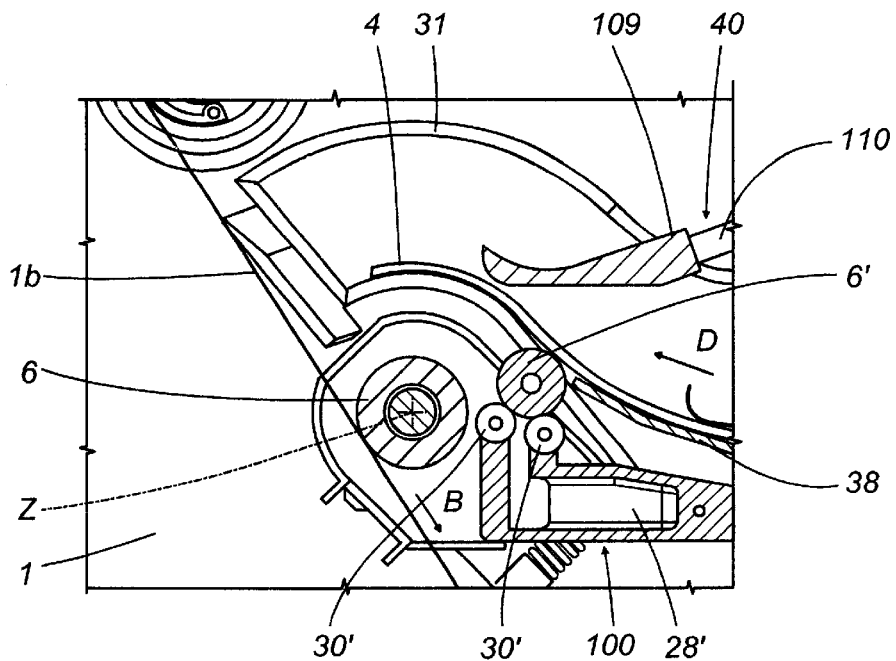
FIG. 17 is a schematic top plan view, with some parts cut away in order to better illustrate others, of another embodiment of the working parts illustrated in FIG. 5.

In a second embodiment, illustrated schematically in FIG. 17, in which the roller 6 is simply a contact roller for the edge 1b, there are glue feed means 100, again consisting of a glue pot 28' and a pair of spreader rollers 30' in contact with another roller 6' which applies glue to the surface of the edge band 4 in direction D. The roller 6' is located downstream of the contact roller 6 relative to the feed direction D of the edge band 4, whose other surface is guided by a guide element 40.

The guide element 40 (see FIG. 17 again) consists of a blade 109 mounted on a rod 110 which is connected with a supporting structure 31 and which slides axially between an idle position, in which the blade 109 is away from the glue applicator roller 6' and a working position (shown in FIG. 17) in which the blade 109 is close to the roller 6' and opposes the edge band 4. As described in more detail below, the guide element 40 can be used as such even in the embodiment where the roller 6 is also used to apply glue to the edge 1b.

For convenience, we will now describe the embodiment where the roller 6 is used to apply glue to the edge 1b of the panel 1, although the structure of the unit described below is identical in both the embodiments mentioned above.

Figure 5:
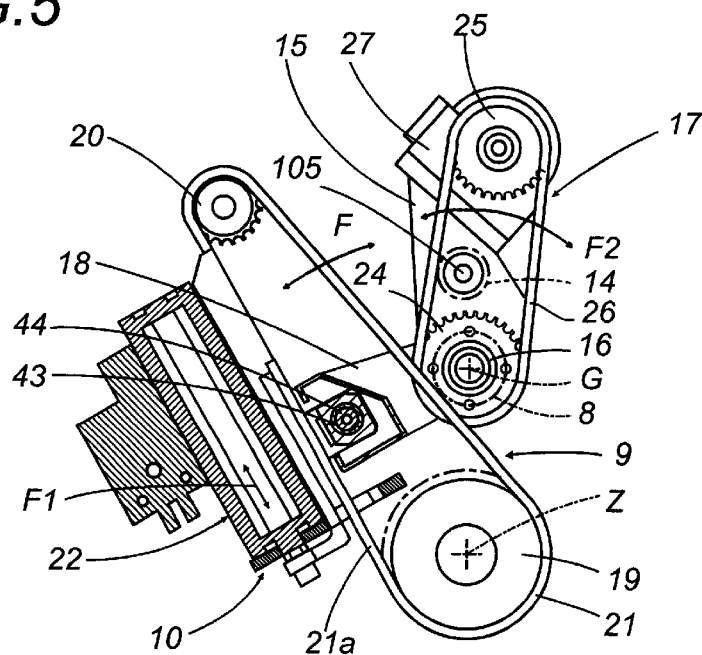
FIG. 5 is a schematic top plan view, with some parts cut away in order to better illustrate others, of some of the drive parts of the device disclosed herein.
Figure 6:
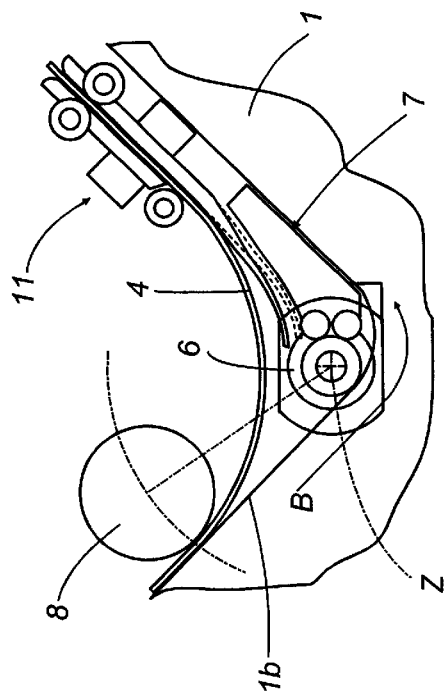
FIGS. 6 through 9 are schematic top plan views of a series of working configurations that can be obtained with the device disclosed on a panel with a straight and concave profile.

The first main pressure roller 8 of the edge band 4 is located downstream of the applicator roller 6 relative to the edge banding direction B, can turn freely about its vertical axis and is linked to a first connecting-rod 9 which is in turn pivoted to the shaft forming the main axis Z (see FIG. 5 in particular).

The first connecting-rod 9 is connected to first means 10 for pressing the first roller 8 against the edge 1b and at the same time adjusting the angular position of the roller relative to the position of the glue applicator roller 6 in accordance with the profile of the edge 1b of the panel 1. In this way, the means 10 keep the first roller 8 pressed against the edge band 4 that has just been laid on the edge 1b.

Figure 2:
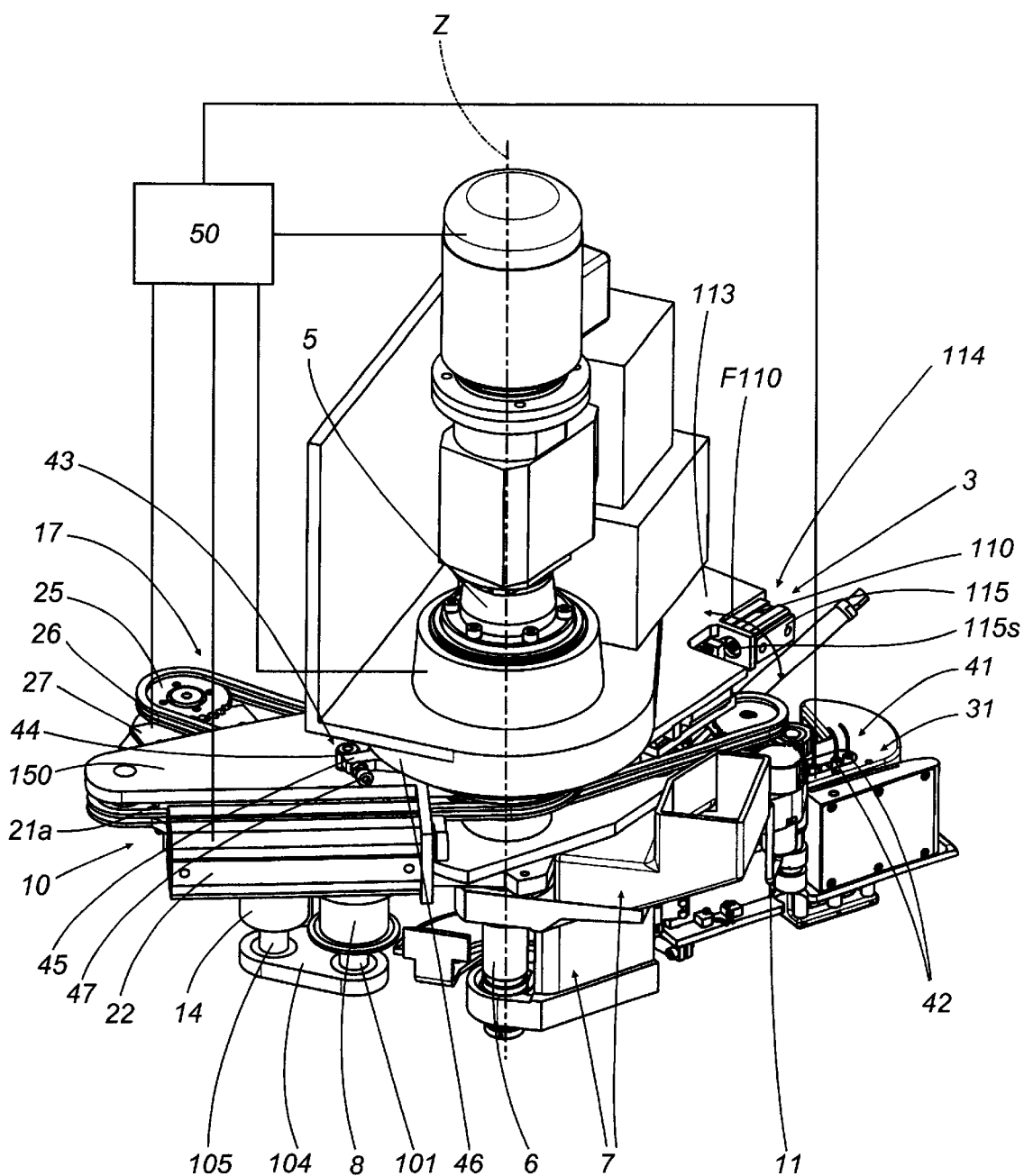
FIG. 2 shows the panel edge banding device made according to the present invention in a perspective view, scaled-up compared to FIG. 1 and with some parts cut away in order to better illustrate others.
Figure 3:
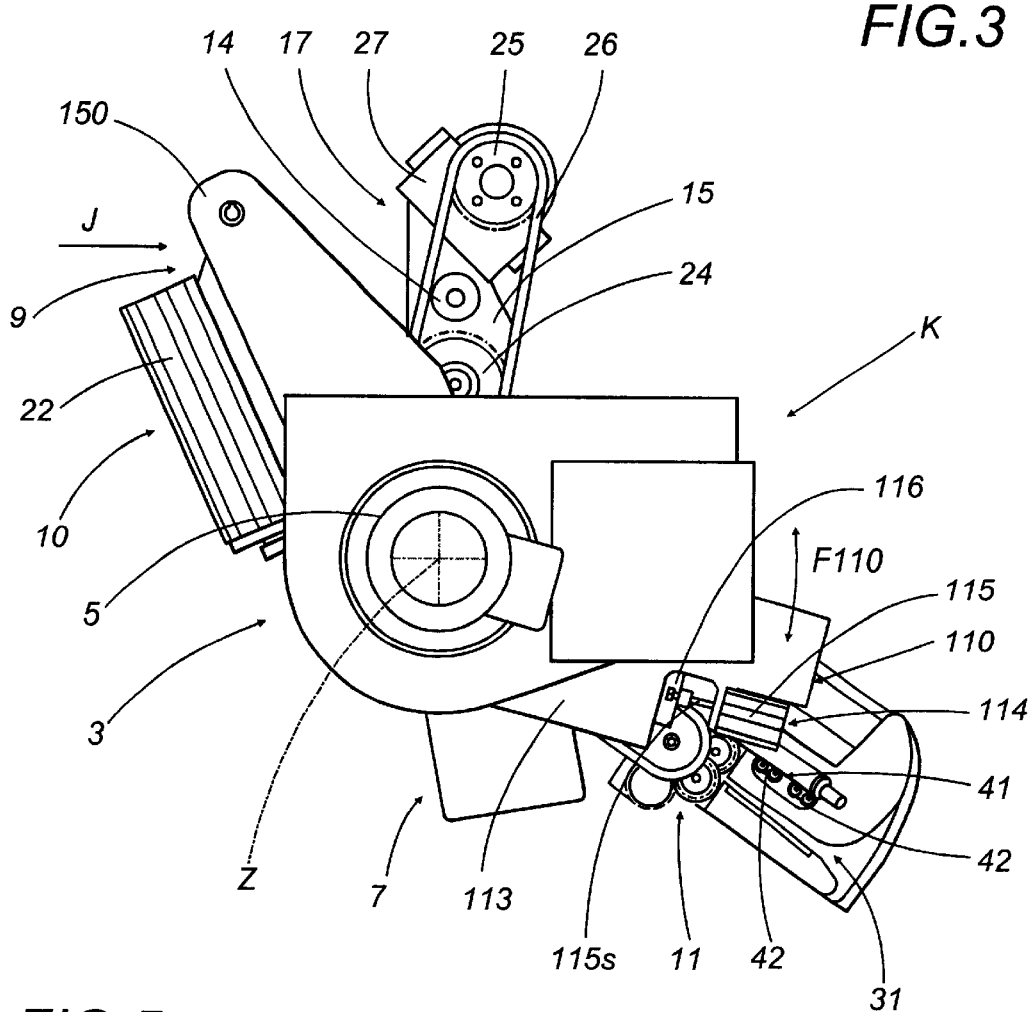
FIG. 3 is a top plan view, with some parts cut away in order to better illustrate others, of the panel edge banding device as shown in FIG. 2.

Looking in more detail and with reference also to FIGS. 2, 3 and 5, the first pressure and adjusting means of the first main roller 8 consist of the first connecting-rod 9 pivoted to the shaft forming the main axis Z.

On the ends of the first connecting-rod 9, there is a pair of toothed wheels 19 and 20 around which a first chain 21 is looped. At one branch 21a of the chain 21, there are first drive means 22, connected to the first connecting-rod 9 and acting on the first branch in such a way as to allow the connecting-rod to turn in both directions (see arrows F in FIG. 5) according to the profile of the edge 1b. In other words, the first drive means 22, consisting for example, of a linear actuator, are extended and retracted (see arrow F1 in FIG. 5) in such a way as to cause the first connecting-rod 9 to turn since the toothed wheel 19 is keyed to the main shaft 5, that forms the main axis Z.

The main pressure roller 8 is connected to the first connecting-rod 9 by a central arm 18 which is attached at one end to the connecting-rod itself (or to a first upper guard 150 where the linear actuator 22 is also connected), which extends crossways with respect to the chain 21, and which, at its other end, mounts the main roller 8. The latter is therefore outside the working area of the first connecting-rod 9.

As shown in FIGS. 2 through 5, besides the first main roller 8, there is at least one secondary pressure roller 14 located downstream of the first main roller 8 relative to the edge banding direction B.

The second roller 14 is linked to a second connecting-rod 15 pivoted at one end to a first shaft 16, mounted on the first arm 18, which is coaxial with the first main roller 8 and which forms a pivot point G of the second roller 14. There are also second means 17 for pressing on the second roller 14 and adjusting its position relative to the first roller 8 in accordance with the profile of the edge 1b of the panel 1, so that it remains in contact with the edge band 4 that has been applied.

Looking in more detail, the second pressing and adjustment means 17 consist of the second connecting-rod 15 having, on the ends of it, corresponding second toothed wheels 24 and 25 around which a second chain 26 is looped, the second toothed wheel 24 being securely keyed to the first shaft 16.

At the other toothed wheel 25, there are second means 27 for driving the second connecting-rod 15, the means 27 consisting, for example, of a rotary actuator acting on the toothed wheel 25 to turn the second roller 14 in both directions (see arrow F2 in FIG. 5), relative to the position of the first roller 8, in accordance with the profile of the edge 1b and in such a way as to keep the second roller 14 in contact with the edge.

In short, structuring the two pressure rollers in this way provides two elements (both exerting pressure on the edge band but to different extents, the first roller more than the second) which are connected to each other in sequence and which are both able to rotate, the first about the pivot point Z and the second about the pivot point G, where the point G is the instantaneous position assumed by the first roller 8.

As also shown in FIGS. 14, 15 and 16, the first and second pressure rollers 8 and 14 (which are preferably made of steel) are mounted in such a way that they can turn freely on corresponding first and second shafts 101 and 105. The first shaft 101 is mounted at the free end of the central arm 18, while the second shaft 105 is mounted directly on the second connecting-rod 15. On the ends of each of the two shafts 101 and 105 there are corresponding first and second rubber rings 102, 103 and 106, 107 connected to a single supporting element 104, at the lower end, that supports each of the two units consisting of the shaft 101 or 105, the roller 8 or 14 and the rings 102, 103 or 106, 107.

In practice, the first and second shafts 101 and 105 are rigidly connected to each other at their lower ends by the single supporting element 104 that has, in turn, a vertical joining column 108 connected to the second connecting-rod 15.

The two pairs of rings 102, 103 and 106, 107 provide the corresponding rollers 8 and 14 with axial flexibility to enable the related shafts 101 and 105 and the corresponding rollers 8 and 14 to adjust to different shapes when they come into contact with the band 4 applied to the edge 1b.

Thanks to this flexibility, the two rollers easily adapt to the shape of the surface being pressed, compensating for imperfect assembling of the rollers or irregularities on the edge 1b of the panel 1 caused by previous machining. That means that each of the rollers 8 and 14 maintains a high specific thrust on the edge band 4 and, hence, allows good product quality to be achieved.

The numeral 11 in FIG. 4 indicates means for feeding the edge band 4. The means 11 are located close to the roller 6 that applies glue to the edge 1b and move together with the glue feed means 7.

The means 11 are made in such a way as to form a channel 12 through which the edge band 4, when required, is fed to the edge 1b in an area 13 between the applicator roller 6 and the two pressure rollers 8 and 14. Thus, the edge band 4 is placed in contact with the surface of the edge 1b and pressed by the rollers 8 and 14 to attach it permanently to the panel edge.

Looking in more detail, the feed means 11 comprise a supporting and covering structure 31 which houses a first pair of motor-driven rollers 32 for feeding the edge band 4 (which comes from a magazine that is not illustrated), the rollers being fitted opposite each other in such a way as to move the continuous edge band towards the edge 1b in the feed direction D.

Downstream of the pair of rollers 32, relative to the feed direction D, there are means 33 for detecting the passage of the edge band 4, operating on related stop means 34 located upstream of the pair of rollers 32, again relative to the feed direction D. The means 34 are designed to stop the feeding of the edge band 4 according to the position of the unit relative to the edge 1b.

The edge band 4 detecting means 33 may consist (see FIG. 4 again) of at least one pair of optical units 35 placed opposite each other. The stop means 34 may consist of: a presser element 36 which, when activated, acts in a direction transversal to the feed direction D on a section of the edge band 4 being fed; and a straight wall 37 against which the presser element 36 presses the edge band 4 to stop it.

In addition to these elements, the supporting structure 31 also houses an arm 38 designed to guide the edge band 4 and located downstream of the detecting means 33 relative to the feed direction D. The guide arm 38 is positioned parallel to the edge band 4 and is pivoted at one end, at C, to the supporting structure 31.

The arm 38 has drive means 39 (which may consist of a cylinder, illustrated schematically as a block in FIG. 4), the means 39 allowing the arm to rotate between two or, preferably, three positions: an idle position (shown by a continuous line in FIG. 4) when no edge band 4 is detected and in which the arm 38 is close to the glue pot 28, and at least two working feed positions (of which one is clearly visible in FIGS. 6 to 13 and shown by dashed lines in FIG. 4) in which the arm 38 is away from the glue pot 28, close to the guide element 40 and in contact with the edge band 4 in such a way as to keep the latter on a defined feed line which does not interfere with the glue applicator roller 6 limits the risk of the edge band springing back against the glue applicator roller 6. Obviously, the working angle of the arm 38 depends on the thickness of the edge band 4.

The numeral 41 indicates means for heating the edge band 4 located upstream of the stop means 34, relative to the feed direction D, and designed to make the edge band more pliable, especially when the edge banding being applied is quite thick.

The heating means 41 comprise one or more shortwave infrared ray emitting units 42 positioned parallel to each other and transversal to the direction of feed D.

As mentioned above, the feed means 11 just described and the glue feed means 7 can tilt about the shaft that forms the main axis Z.

Figure 18:
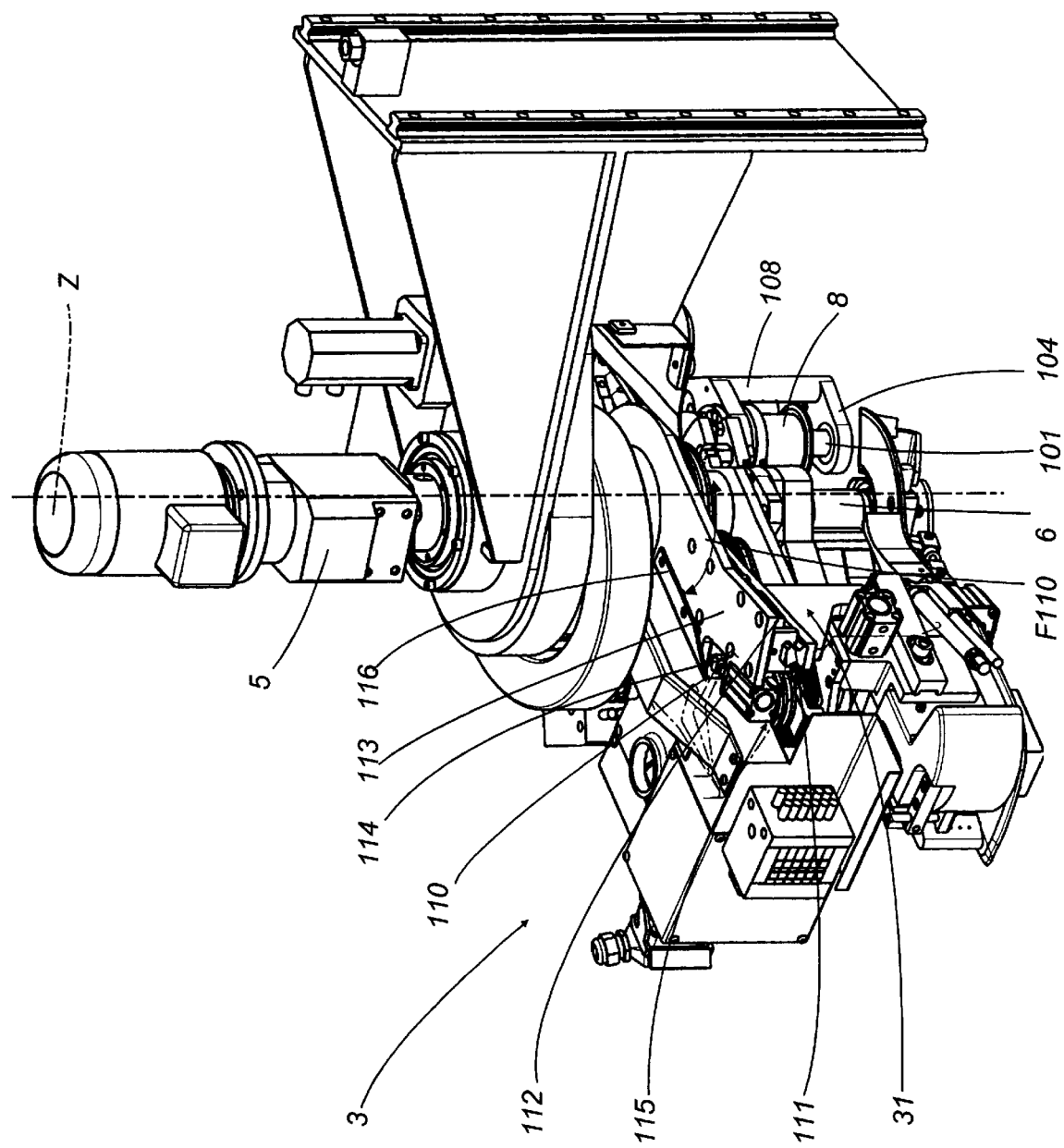
FIG. 18 shows the device made according to the present invention in a perspective view from K in FIG. 3.
Figure 19:
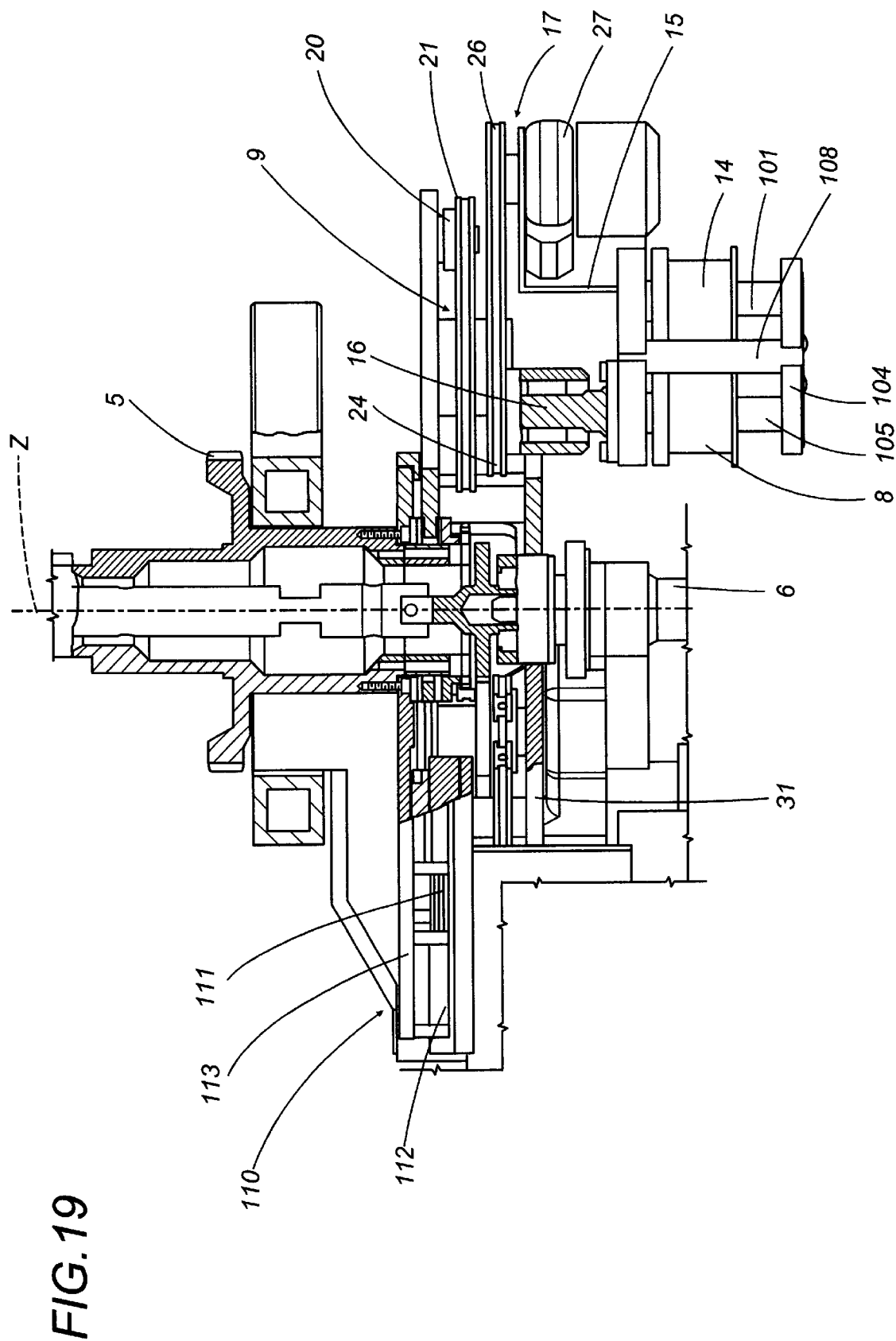
FIG. 19 is a side view, with some parts cut away in order to better illustrate others, of the device illustrated in FIG. 18.

This angular adjustment is accomplished by means 110 (visible clearly in FIGS. 18 and 19) and partly in FIGS. 2 and 3) for adjusting the position of the means 11 and 7, that is, tilting the latter about the main axis Z according to the profile of the panel 1.

The adjustment means 110 consist of the above mentioned supporting and covering structure 31 of all the parts just described that form the means 11 for feeding the edge band 4 and the means 7 for feeding the glue, the structure 31 being free to turn about the main axis Z.

At the top of the supporting structure 31, there is a linear guide 111, that is slidably coupled to a counter-guide 112 made on a main mounting plate 113 that is rotatably connected to the shaft 5 forming the main axis Z.

The main mounting plate 113 comprises means 114 that drive it and, hence, also drive the supporting structure 31. The means 114 enable the plate 113 and the supporting structure 31 to tilt about the main axis Z in both directions (see arrow F110 in FIGS. 2, 3 and 18) thanks to the relative sliding of the guide 11 and the counter-guide 112.

The means 114 may consist of a cylinder 115 connected with the mounting plate 113 and whose stem 115s is connected to a fixed wall 116 in such a way that the stem can extend and retract in order to tilt the mounting plate 113 and the supporting structure 31 in accordance with the profile of the edge 1b of the panel 1.

Looking again at the above mentioned central arm 18, forming part of the first connecting-rod 9 and mounting the first roller 8, the arm 18 is equipped with means 43 that lock it in a fixed position in which the first main roller 8 is away from the edge 1b of the panel 1 when the glue applicator roller 6 comes into contact with the panel edge (see FIGS. 2, 15 and 16): this configuration is used, preferably during the initial stages of the edge banding operation to prevent the glue on the panel edge 1b from being smeared on the surface of the roller 8 and subsequently soiling the outer surface of the edge band 4.

The locking means 43 comprise a vertical pin 44 connected with the arm 18 and which can move along its vertical axis between a lowered, idle position in which the arm 18 is able to move, allowing the first main roller 8 to come into contact with the edge 1b, and a raised, working position (shown in FIG. 2), in which the pin 44 is in contact with a wall 45 attached to a fixed structure 46 of the device (forming part of the shaft 5) in such a way as to determine said fixed position.

The fixed wall 45 has a set screw 47 that can be placed opposite the pin 44 in order to vary the position in which the arm 18 stops relative to the set screw so as to adjust the distance between the first roller 8 and the edge 1b in the fixed position.

All the working parts described up to now are controlled and driven by a control unit 50, illustrated schematically as a block in FIG. 2. This unit may be a conventional, CNC system programmed according to the profile of the panel to be edge banded and acting on the device and on the work table 2.

As can be deduced from the above description, the edge banding device operates basically as follows starting from the configuration illustrated in FIG. 4, that is to say, with the edge band 4 stopped inside the channel 12 by the locking means 34 and the arm 18 locked in the fixed position by the raising of the pin 44.

The unit is moved close to the edge 1b of the panel 1 until the edge 1b and the glue applicator roller 6 touch, while the means 50 adjust the position of the mounting plate 113 and the structure 31, acting also on the piston 115, in such a way as to put it in the position most suitable to apply the glue and feed the edge band 4 without interfering with the edge 1b. The unit starts moving in the application direction B, while the edge band 4 is fed towards the outfeed area 13 by the rollers 32. When the edge band 4 comes into contact with the edge 1b, the arm 18 is released by the lowering of the pin 44 and can start pressing on the edge band 4, together with the second roller 14, in order to join it to the edge 1b (see FIG. 6).

Figure 7:
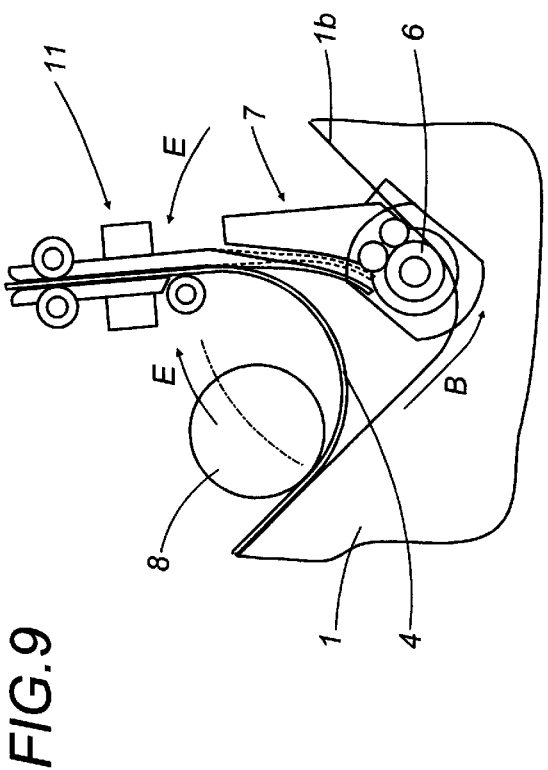
Figure 8:
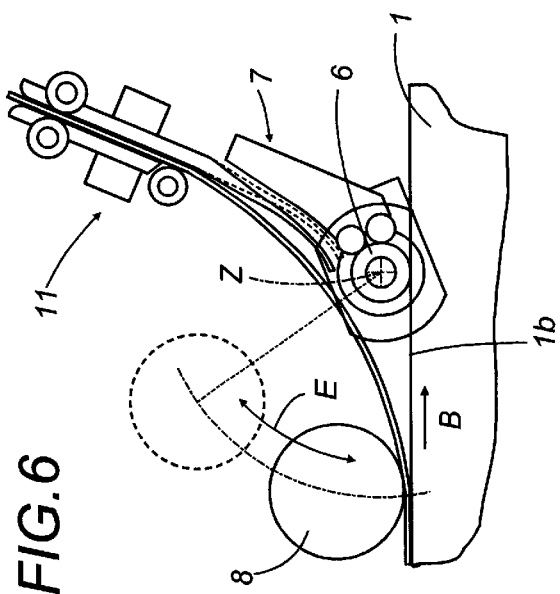
Figure 9:
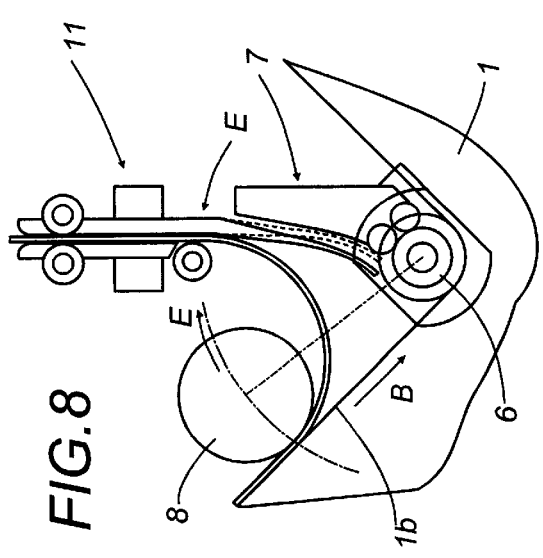

This working configuration continues until the edge 1b right around the panel is covered, the unit even assuming "limit" positions as it follows the profile of the edge: FIGS. 7 to 9, for example, show the unit as it works on an edge with a profile that forms a right-angled concavity, and highlight the extreme flexibility of the components, especially the tilting (indicated by the arrows E) of the pressure rollers and of the glue and edge band 4 feed unit which allows them to automatically move to the most suitable working position according to the edge profile and without slowing down their operation.

FIGS. 10 through 13 show another working "limit" condition in which the unit disclosed can apply the edge band quickly and reliably, with top-quality results, thanks also to the double joint of the pressure rollers, shown clearly in FIG. 13.

Without changing the structure of the components described until now, and as mentioned at the beginning of the present description, the glue feed means 7, incorporated in the edge band feed means 11, may be connected to the shaft which forms the main axis Z through suspension elements 200 designed to enable them to oscillate in a straight line with an irrotational movement in a plane and along two axes perpendicular to the main axis Z.

Looking in more detail (see FIGS. 20 and 21), the suspension elements 200 are located between the main mounting plate 113, connected to the fixed structure of the device, and the covering structure 31 that houses the feed means 7 and the edge band feed means 11 (in these illustrations, the means 7 and 11 are not shown because they lie under the mounting plate 113/covering structure 31 assembly.

The suspension elements 200 consist of three separate pairs of connecting-rods 201, 202, 203 located between the mounting plate 113 and the covering structure 31 and linked to them at corresponding limit points. The three pairs of connecting-rods are also connected to each other at corresponding intermediate points by a rigid, substantially Y-shaped element 204: thanks to this configuration, the entire underlying unit can be moved in a plane instead of tilted as described above.

This particular movement requires means of controlling the position of the covering structure 31 relative to the profile of the edge 1b to be edge banded, that is to say, between the main mounting plate 113 and the covering structure 31, there may be means for controlling the position of the covering structure 31 relative to the main axis Z.

Said position control means may comprise a pair of cylinders 205 and 206 (the latter is only partly visible in FIG. 21) fitted at, right angles to each other and linked to the covering structure 31, at one end, while the relative stem is connected to a single vertical reference pin 207 connected to the covering structure 31. The vertical pin 207 is lined up with an opening 208 made in the main mounting plate 113 and on the other side of which there is an inductive sensor 209 (drawn with a dashed line), housed in the mounting plate 113. The sensor is designed to detect the presence of the pin 207 at the opening 208 and to stop the entire device if the pin 207 moves away from the opening 208. The moving away of the pin from the opening indicates that the covering structure 31 is in the wrong position relative to the edge 1b and leads to a program fault in the control unit 50.

Figure 22:
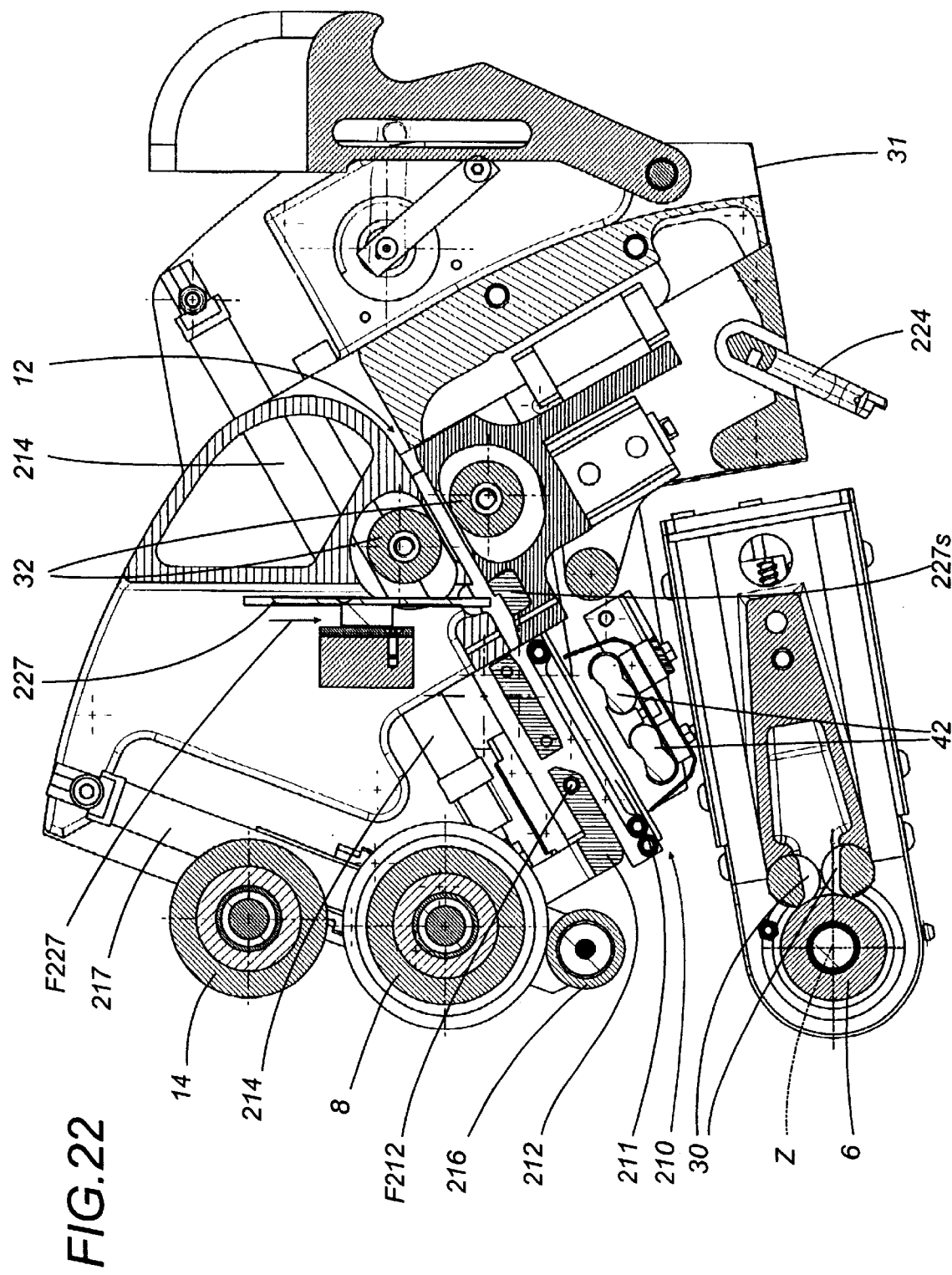
FIGS. 22 and 23 are top plan views, with some parts in cross section, of another embodiment of the edge band feed unit in two different working configurations.
Figure 23:
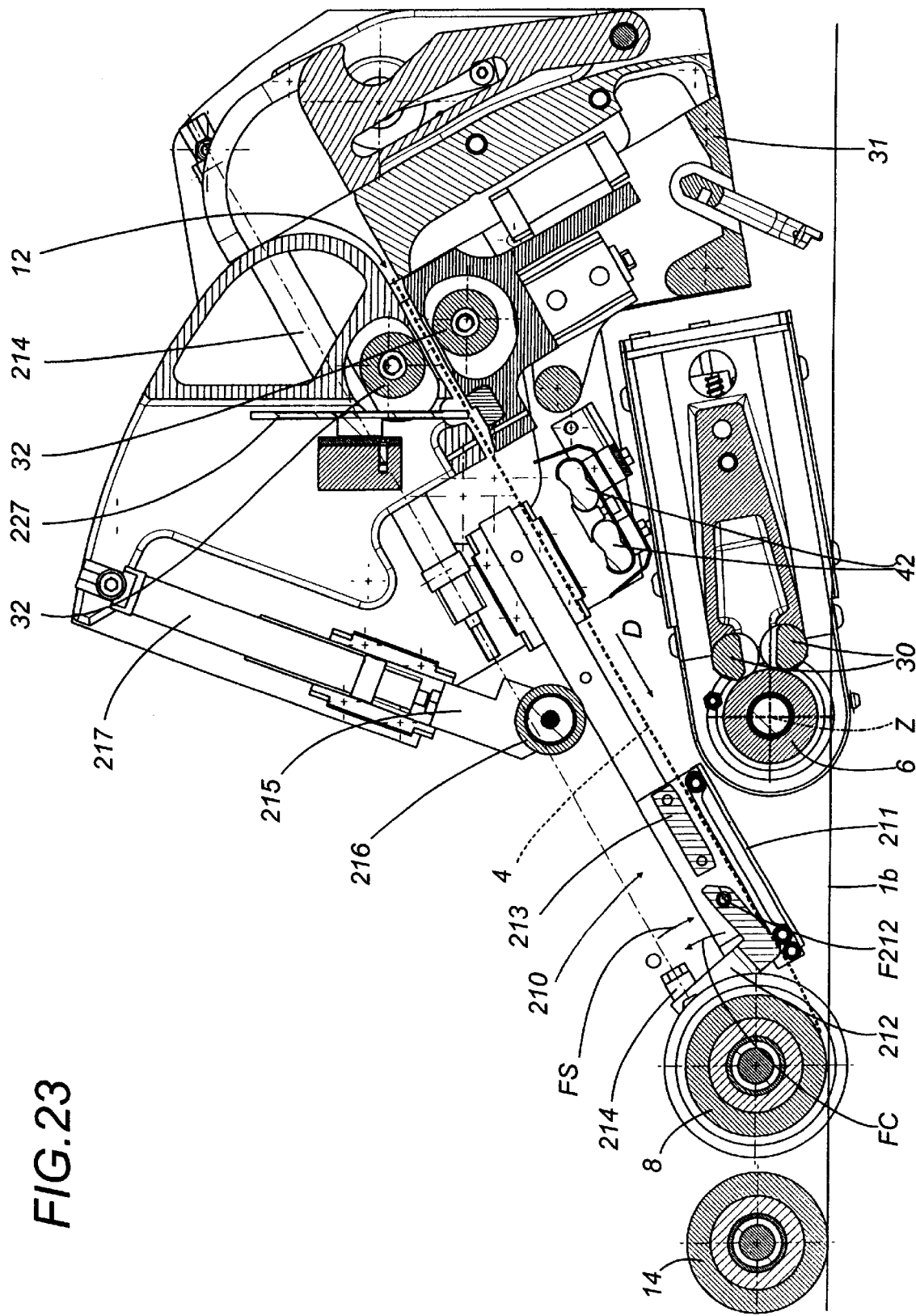
Figure 24:
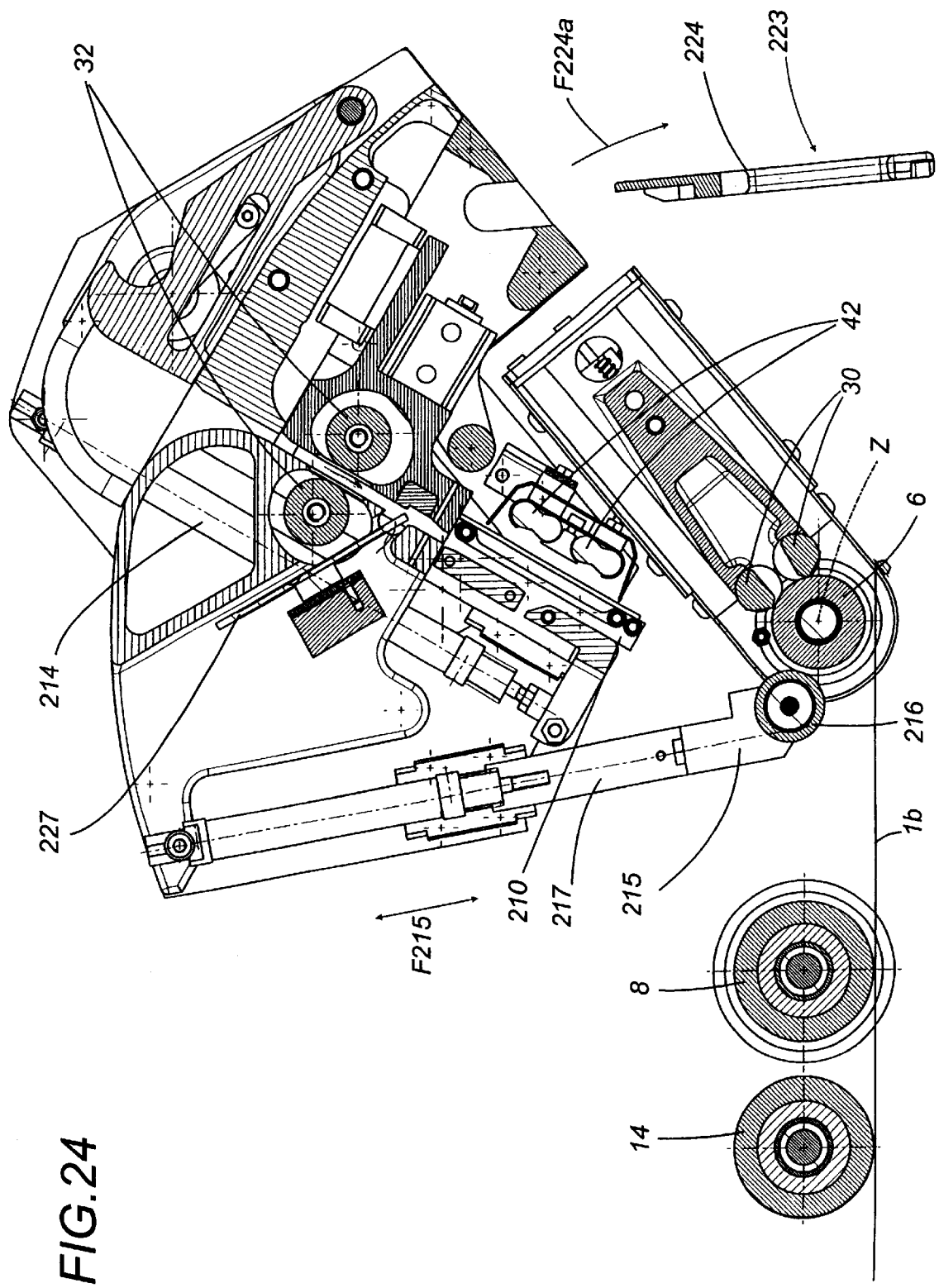
FIG. 24 is a top plan view, with some parts in cross section, of yet another embodiment of the edge band feed unit shown in FIGS. 22 and 23.

The different way of tilting the covering structure 31 makes it possible to change the arrangement of the edge band 4 feed means 11 (along a 90° arc, which is a more compact arrangement than the one described above) but not the way they are made within the covering structure (as can be seen in FIGS. 22, 23, and 24).

An addition to the elements described above is illustrated in FIGS. 22 and 23, where a carriage 210 has been added to guide and carry the edge band 4 from the pair of feed rollers 32 to the proximity of the edge 1b at the start of the work cycle, that is, when the edge band starts being applied to the panel 1.

The carriage 210 has a fixed base 211 and a pair of arms 212 and 213 located opposite the base 211 in such a way as to form the continuation of the channel 12 for the passage of the edge band. Acting on the carriage 210 there is a cylinder 214 connected to the covering structure 31 and designed to drive the carriage 210 from a retracted, idle position (see FIG. 22) to a forward, working position in which it carries the edge band 4 close to the edge 1b (see FIG. 23). The edge band 4 is carried at the same speed as that at which the rollers 32 feed it in direction D.

The stem of the cylinder 214 is connected to the end of the arm 212, which is L-shaped and pivoted at F212 to the body of the carriage 210 in such a way as to allow a portion of the edge band 4 to be rotated to a stop position in direction FC during the passage from the retracted to the forward position, under the thrusting action of the cylinder 214, and then to rotate the edge band 4 to a released position in the opposite direction FS when it is applied to the edge 1b. The release is effected by further moving forward only the carriage 210, with the stem fixed and acting this time as a center of rotation.

Once the edge band 4 has been loaded, the carriage 210 returns to the retracted, idle position and stays there until the end of the working cycle on the current panel.

In another embodiment, illustrated in FIG. 24, the edge band feed means 11 further comprise a feed arm 215 that applies glue to the edge band 4, this arm being equipped with a counter roller 216 at its free end and a cylinder 217 that drives it from an idle position, in which it is away from the glue applicator roller 6 and a working position (indicated by the arrow F215 in FIG. 24), in which it is close to the glue applicator roller 6, with the edge band 4 (not illustrated in this case) between the roller 6 and the counter roller 216.

The loading of the edge band 4 may be effected again independently of the direction of rotation of the glue applicator roller 6 because the two rollers 32 that feed and load the edge band 4 have corresponding kinematic elements 218 which enable them to also rotate in the feed direction D in such a way as to feed the edge band but independently of the direction of rotation of the glue applicator roller 6.

Figure 27:
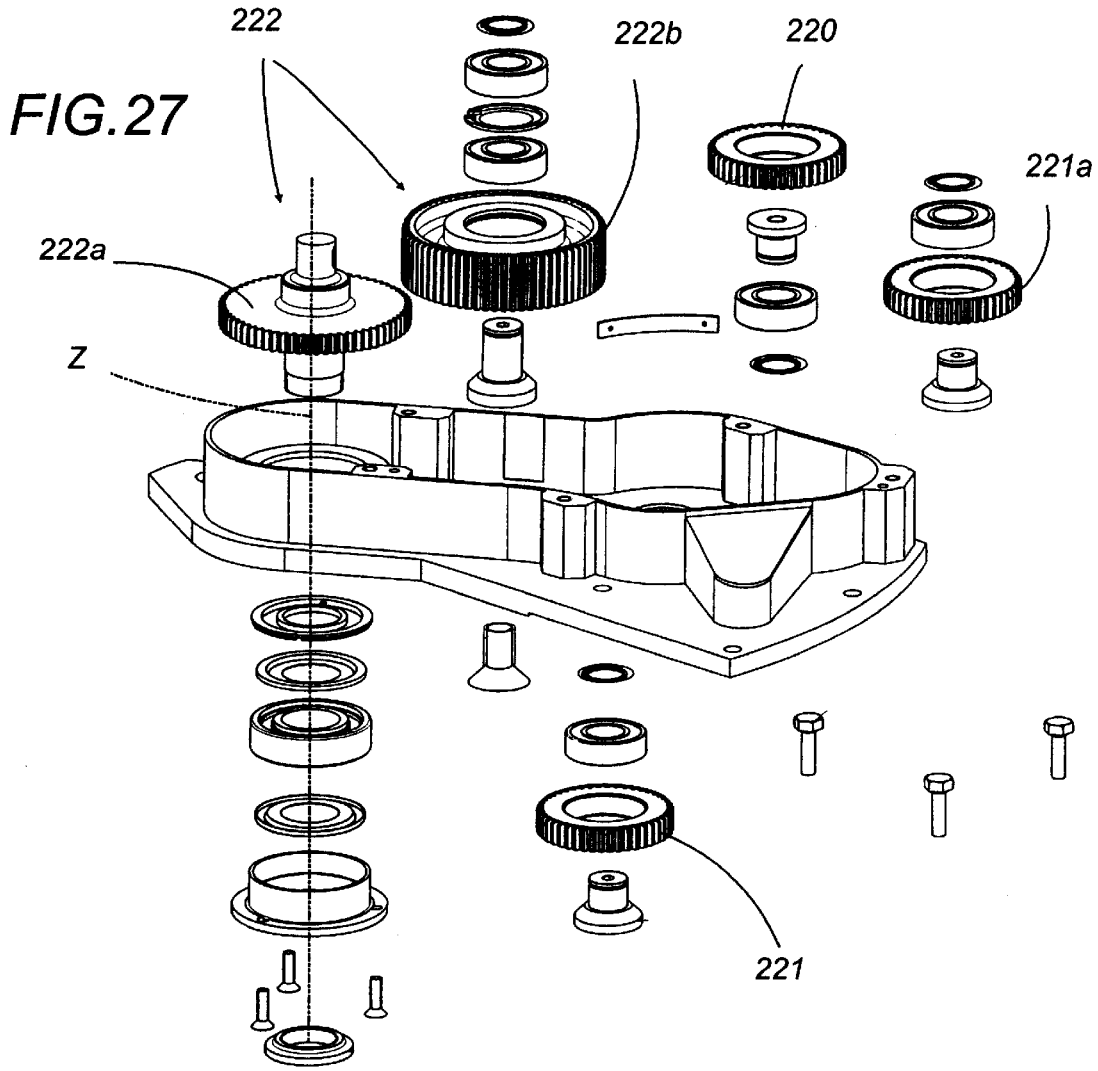
FIG. 27 is a perspective, exploded view of a plate that forms part of an upper cover of the glue and edge band feed unit, showing also some parts of the drive gear with reference to FIG. 21.

The kinematic elements 218 (see FIGS. 21 and 27) consist of a pair of first toothed wheels 218a and 218b (drawn with dashed lines in FIG. 21) keyed to a single rotating shaft 219 connected to the feed rollers 32 through a unit that transmits motion to all the means for feeding the edge band and the glue (not illustrated in this case). The two first toothed wheels 218a and 218b are housed at the top of the covering structure 31 and each of the two first toothed wheels 218a and 218b meshes with corresponding second toothed wheels 220 and 221 which are linked to the drive elements 222 of the device, are connected to the (motor-driven) shaft forming the main axis Z, and are driven in opposite directions of rotation.

In practice, the kinematic elements 222 comprise a drive wheel 222a on the shaft forming the main axis Z and meshed with a driven wheel 222b which enable drive to be transmitted to the two above mentioned second toothed wheels 220 and 221: one of the second toothed wheels, the one labeled 220, meshes directly with one of the first toothed wheels, the one labeled 218a, while the other second toothed wheel, the one labeled 221, meshes with an idle wheel 221a which meshes with the first wheel 218b.

Each of the first toothed wheels 218a and 218b is equipped with free wheel means 218c designed to enable it to turn freely on the shaft 219 when the shaft forming the main axis Z turns in the direction opposite to its own.

The covering structure 31 also comprises means 223 for detecting the length of the edge band 4 and cutting off the edge band 4 when it has gone right around the panel to join the starting end 4a that was applied first.

Figure 25:
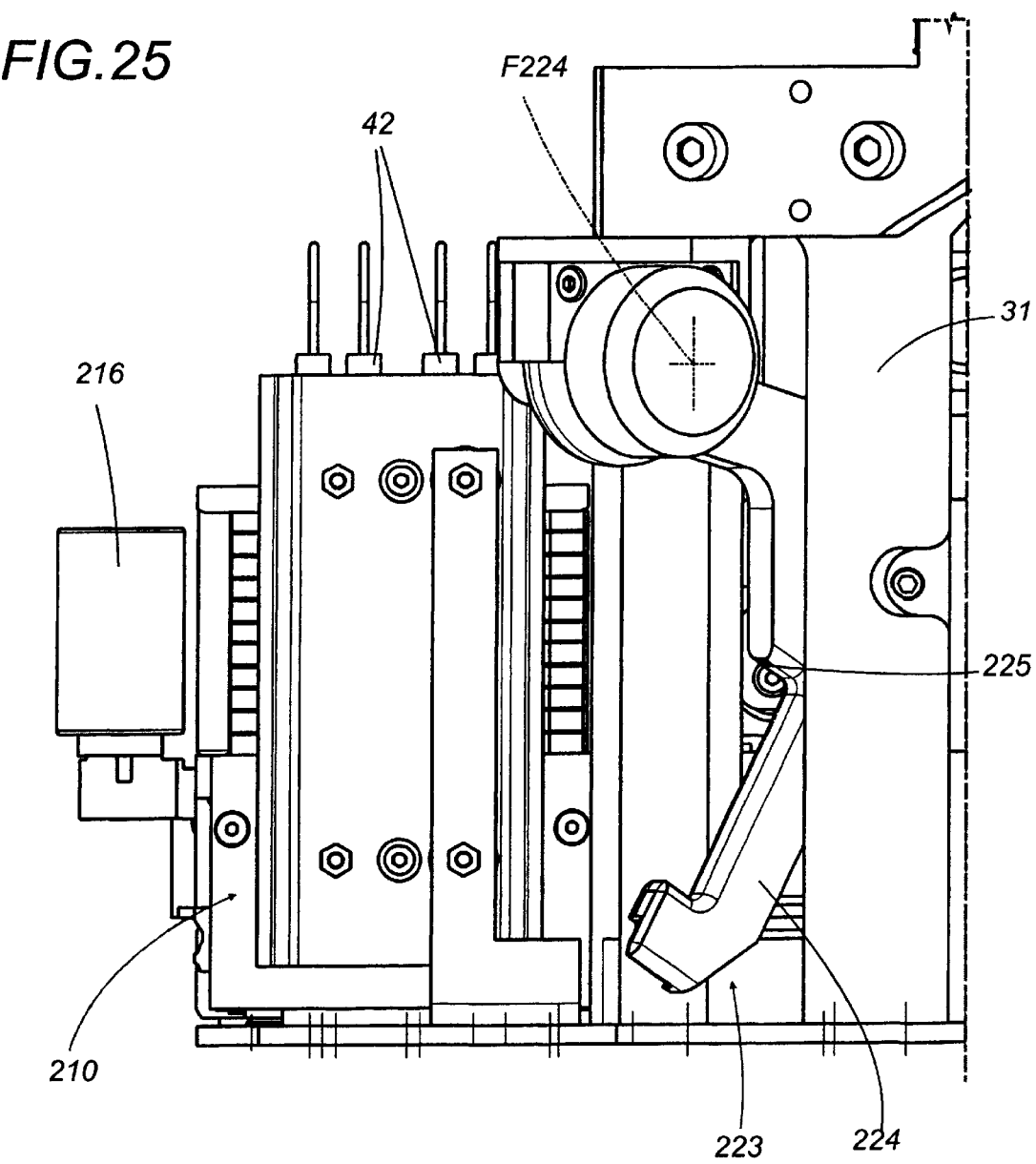
FIG. 25 illustrates a part of the glue and edge band feed unit in a perspective view with some parts cut away in order to better illustrate others.
Figure 26:
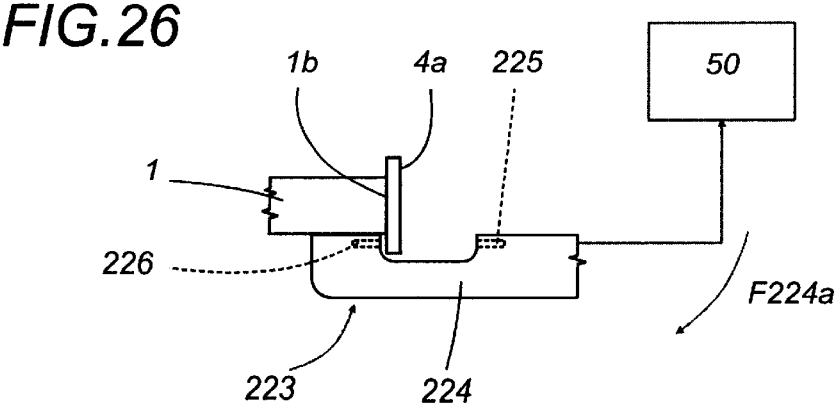
FIG. 26 illustrates a detail of FIG. 25 in a schematic side view.

As shown in FIGS. 24, 25 and 26, the detecting means 223 consist of a rod 224, which is pivoted at F224 to the covering structure 31 and which can rotate between an idle position (see FIG. 25) in which it is withdrawn inside the covering structure 31, and a working position (accomplished by conventional drive means which are not illustrated), in which it protrudes from the structure (see arrow F224a in FIGS. 24 and 26) when necessary and is positioned close to the edge 1b, with a part in contact with the lower surface of the panel 1 to be edge banded.

The rod 224 is equipped with presence sensors 225 and 226 located opposite each other and designed to detect the starting end 4a of the edge band 4 (protruding from the edge 1b and thus blacking out the two sensors) and to send a signal to the control unit 50 which processes the signal and activates a cutoff unit 227, preferably located between the edge band 4 loading rollers 32 and the carriage 210, which cuts the edge band in a direction indicated by the arrow F227 in FIG. 22 and thanks to a front stop 227s located on the channel 12.

The calculation for cutting the edge-band 4 at the correct point is made on the basis of preset parameters programmed in the control unit 50.

Figure 28:
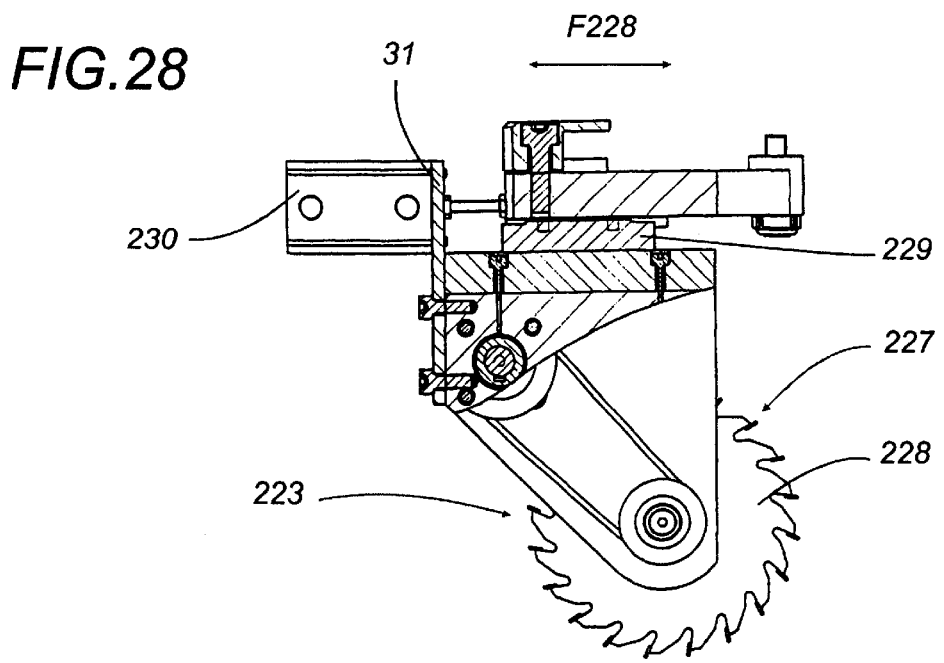
FIG. 28 is a side view, with some parts in cross section, of an end trimming tool that can be applied to the edge banding device disclosed.

The cutoff unit 227 (see FIG. 28) consists of a circular cutter 228 mounted on a base 229 that is slidably connected to the covering structure 31 and linked to a cylinder 230 that drives it between a forward working position and a retracted, idle position (see arrow F228 in FIG. 28).

Figure 29:
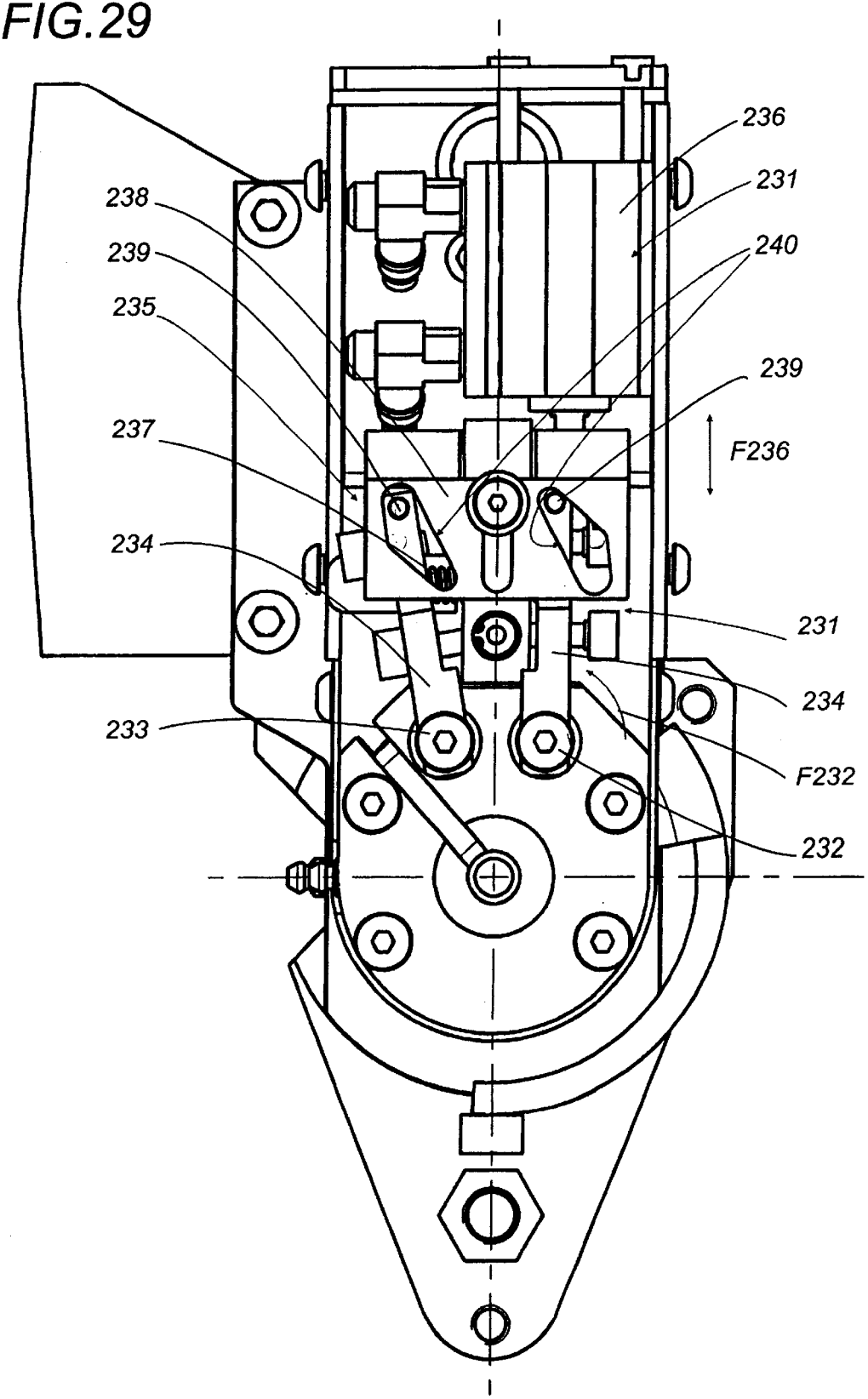
FIG. 29 is a top plan view, with some parts cut away in order to better illustrate others, of a feed cylinder drive unit.
Figure 30:
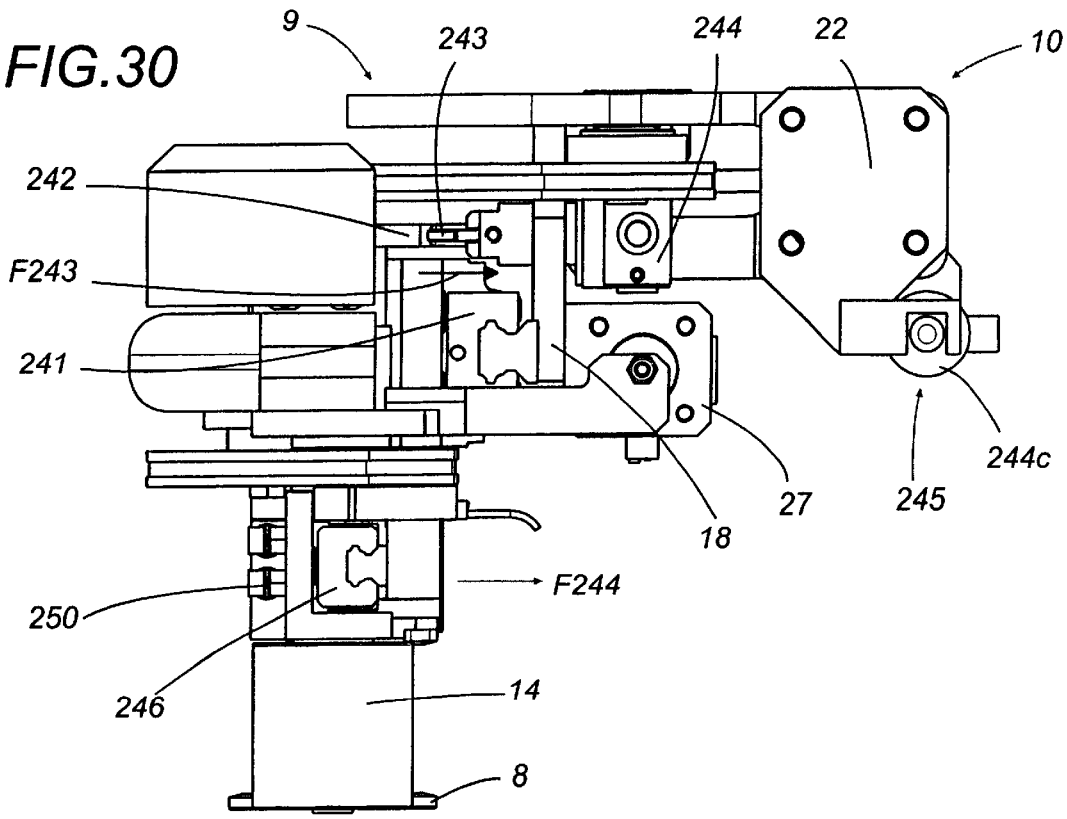
FIGS. 30 and 31 show the pair of pressure rollers in a front view and a perspective view, respectively, and with some parts cut away in order to better illustrate others.

FIG. 29 shows the lower part of the glue feed means 7, that is, the part that controls the pair of glue spreader rollers 30 (not illustrated in FIG. 29).

The two glue spreader rollers 30 are equipped with independent drive means 231 which open and close them in accordance with the direction of rotation of the glue applicator roller 6 and even according to where the glue is to be applied (on the panel edge 1b or on the edge band 4).

The drive means 231 consist of a vertical shaft 232 and 233 to connect each cylinder 30, each shaft 232, 233 being equipped with a rod 234, perpendicular to it and acted upon by cam means 235 which are in turn acted upon by drive means 236 in such a way as to open one spreader roller 30 and close the other and vice versa (in the illustration, the shaft 232 has opened its spreader roller—see arrow F232—while the shaft 233 is keeping its cylinder 30 in the closed position).

Between the two rods 234, there are spring means 237 designed to keep the rods apart so as to keep the corresponding spreader rollers 30 closed when the spreader rollers themselves and the drive cylinder 236 are in the idle position.

Looking in more detail, the above mentioned cam means 235 consist of a tubular carriage 238 within which the shafts 232, 233 can be housed, each shaft having a cam follower pin 239 placed in contact with the corresponding cam profiles 240 made on a wall of the carriage 238: this way, when the drive means 236 (consisting of a two-position pneumatic cylinder connected to the carriage 238) are moved in one direction or the other, one or other of the spreader rollers 30 is opened (see arrow F236 in FIG. 29).

FIGS. 30 through 33 show the part of the device comprising the first and second pressure rollers 8 and 14 which press the edge band 4 on the panel 1.

From these illustrations it can be seen that the first pressure roller 8 can slide along the central supporting arm 18 so that its axis of rotation moves away from the main axis Z (see arrow FZ in FIG. 31): this mechanism prevents the first roller 8 from jamming on the edge 1b of the panel 1 when it meets particularly sharp corners (for example at right angles) where the thrust applied by the first pressure means 10 to the roller 8 would risk breaking the roller if it were not free to slide.

The first roller 8 slides on a first guide 241 and, at the top of it, has a cam profile 242 that acts on a cam follower roller 243 connected to an element 244 used to regulate the pressure exerted by the first pressure means 10 so as to adjust the position of the first roller 8. The regulator 244 is designed to reduce the pressure of the roller 8 on the edge 1b (see arrow F244 in FIG. 30) by releasing pressure from one chamber to the other of the cylinder forming the first drive means 22, as the roller moves away from the main axis Z on account of the force tending to jam it and created by the cam follower roller 243 moving back (see arrow F243).

Means 245 are envisaged to act on the first pressure means 10 so as to restore initial working conditions when the jamming force stops. These means may be constituted by the control unit 50 or by another cylinder 244c mounted in parallel with the cylinder 22 and always set to thrust conditions in parallel with the cylinder 22.

Figure 33:
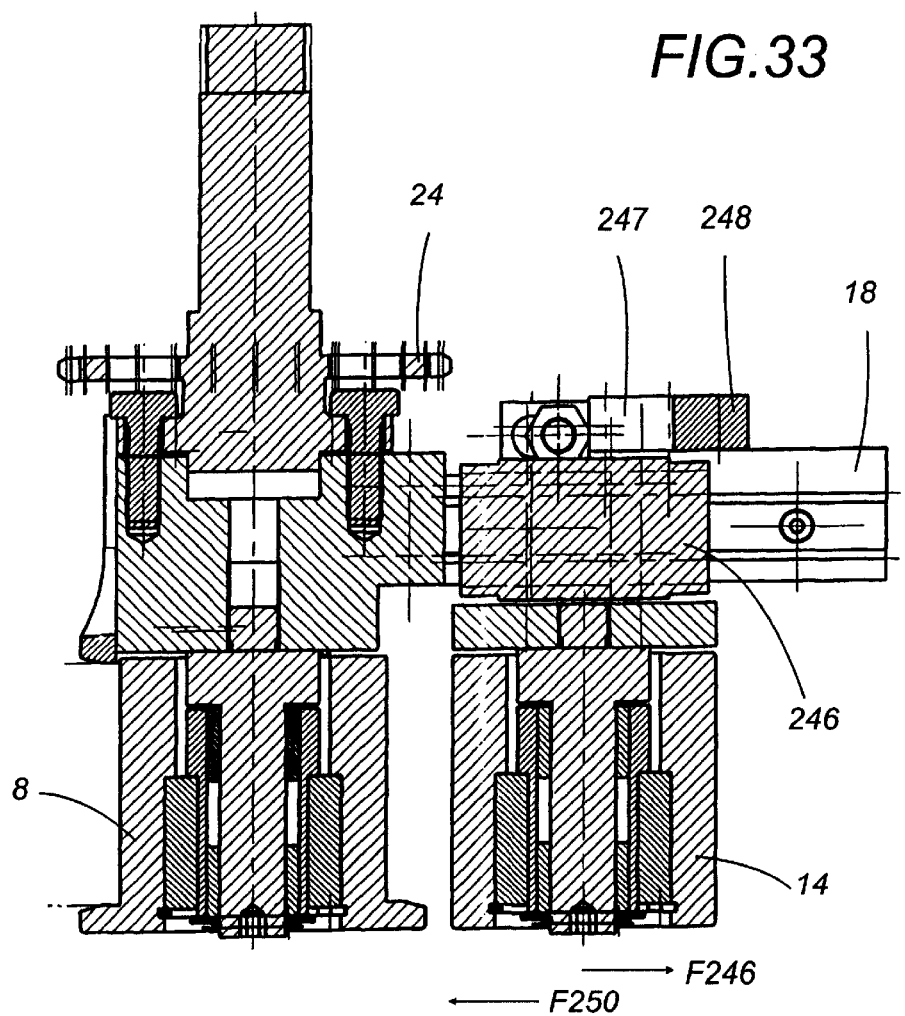
FIG. 33 is a cross section through line XXIII—XXIII in FIG. 32.
Figure 32:
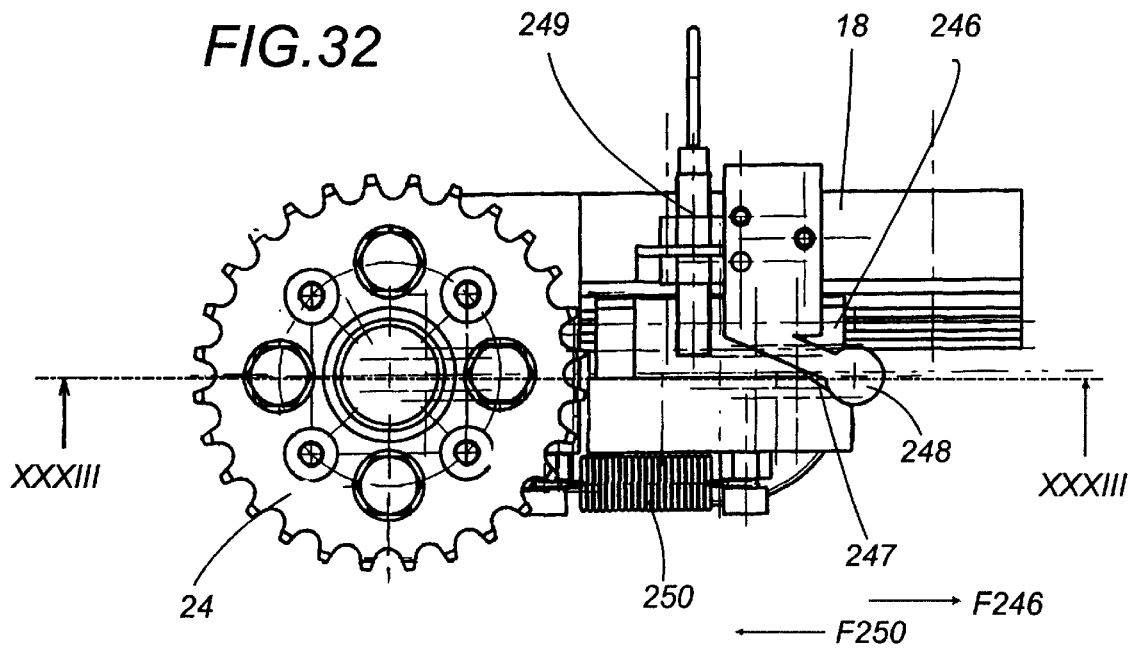
FIG. 32 is a top plan view of a part of the pair of pressure rollers shown in FIGS. 30 and 31.

The above description of the first pressure roller 8 also applies to the second pressure roller 14, which slides along the central arm 18 so that its axis of rotation moves away from the main axis Z (see arrow F246 in FIGS. 32 and 33).

The second roller 14 slides on a second guide 246 made on the central arm 18 and, at the top of it, the roller has a cam profile 247 that in turn acts on a cam follower roller 248 connected to regulator valve means 249 used to reduce the pressure exerted by the second pressure means 17 (that is, of the cylinder 27) acting on the second roller 14 in such a way as to reduce its pressure on the edge 1b.

Figure 31:
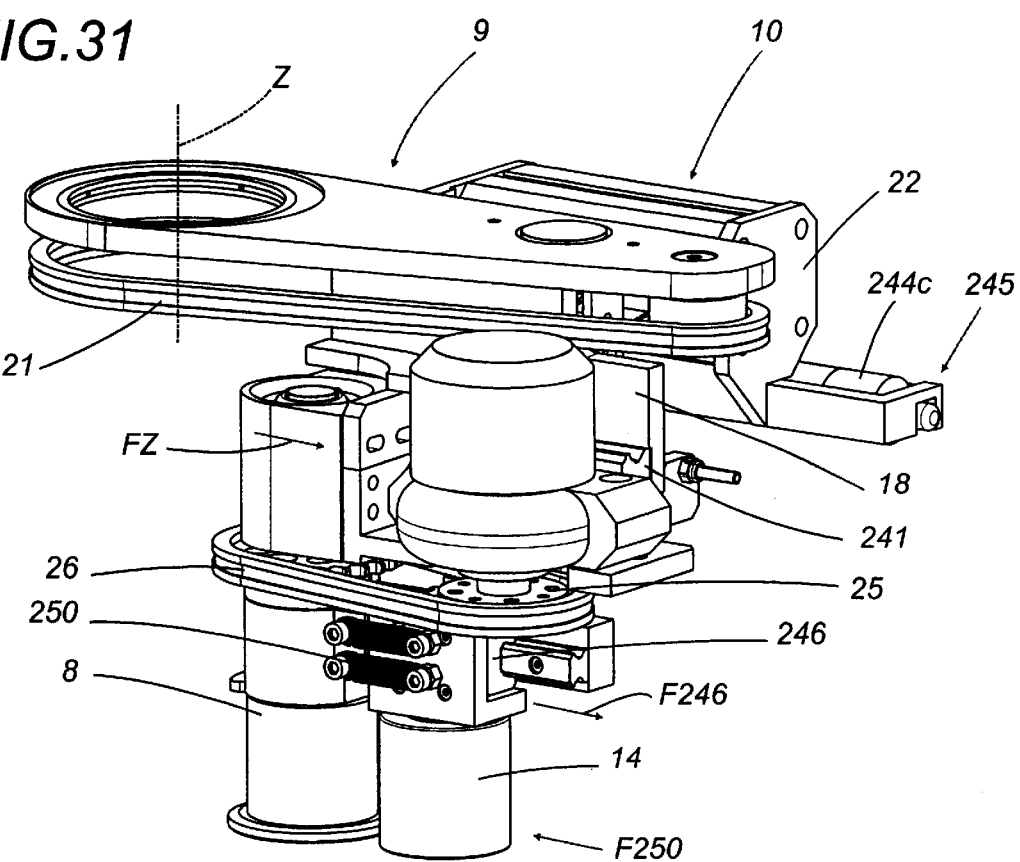

When the force tending to jam the second roller 14 stops, the initial working conditions are restored by spring means 250 connected to the roller and to the central arm 18 (see arrow F250 in FIG. 31).

The device as described above therefore achieves the aims of the invention by providing an extremely compact unit equipped with a reference roller which may be used either to apply glue to the panel edge or simply as a contact roller used to reference the panel. Working in conjunction with this roller, on each side of it, there are compact operating units which are flexibly positioned thanks to the possibility of oscillating either by tilting about the main reference axis or moving in a straight line and which are structured in such a way as to apply edge banding quickly and reliably, even to panels with profiles having extremely "difficult" shapes.

The invention described can be subject to modifications and variations without thereby departing from the scope of the inventive concept. Moreover, all the details of the invention may be substituted by technically equivalent elements.

What is claimed is:

1. A device for applying edge banding to panels which have differently shaped profiles where the device includes at least one work table on which the panel is securely held, and application means for gluing the edging band to an edge; the application means and the work table being able to move relative to each other, wherein the means for applying the edge band consist of a unit with a motor-driven shaft forming a vertical main axis that mounts and drives at least the following items:

(1) a contact roller for the edge of the panel, capable of rotating freely about its vertical axis, which coincides with the main axis; (2) means for feeding glue; and (3) at least one first main pressure roller, which presses on the edge band, items (2) and (3) located on opposite sides of the contact roller and are able to oscillate about the main axis in accordance with the profile of the panel.

2. The device according to claim 1, wherein the glue feed means and the first main pressure roller are connected to the shaft forming the main axis in such a way that they can tilt about the main axis so as to follow the profile of the panel.

3. The device according to claim 1, wherein the glue feed means is connected to the shaft forming the main axis in such a way that it can move in a straight line and thus follow the profile of the panel.

4. The device according to claim 3, wherein the glue feed means is connected to the shaft which forms the main axis through suspension elements designed to enable it to oscillate in a straight line with an irrotational movement in a plane and along two axes perpendicular to the main axis.

5. The device according to claim 4, wherein the suspension elements are located between a main mounting plate, connected to the shaft forming the main axis, and a covering structure that houses the glue feed means and the edge band feed means.

6. The device according to claim 5, wherein the suspension means consist of three separate pairs of connecting-rods located between the mounting plate and the covering structure and linked to them at corresponding limit points; the pairs of connecting-rods being also connected to each other at corresponding intermediate points by a rigid, substantially Y-shaped element.

7. The device according to claim 5, comprising means located between the main plate and the covering structure and used for controlling the position of the covering structure relative to the main axis, and the profile of the edge of the panel.

8. The device according to claim 5, wherein the position control means consist of a pair of cylinders fitted at right angles to each other and linked to the covering structure, at one end, and to a single vertical reference pin with the corresponding stem; the vertical pin being lined up with an opening made in the main mounting plate and on the other side of which there is an inductive sensor housed in the main mounting plate and designed to detect the presence of the pin at the opening and to stop the entire device when the pin moves away from the opening to indicate that the covering structure is in the wrong position relative to the profile of the edge.

9. The device according to claim 1, wherein the contact roller is a roller that applies glue to the edge and is connected to the glue feed means which spreads glue on the contact roller.

10. The device according to claim 9 comprising means for feeding the edge band in the direction of the edge of the panel, located close to the contact roller and able to oscillate, together with the glue feed means about the main axis in accordance with the profile of the panel; said edge band feed means being made in such a way as to form a channel through which the edge band, when required, is fed to the edge in an area between the glue contact roller and the first main pressure roller.

11. The device according to, claim 9 wherein the glue feed means consist of a glue pot in a housing made in a unit and located near the contact roller; the glue pot being equipped with a pair of spreader rollers which turn freely about the corresponding vertical axes and located between the glue pot and the contact roller so that they can uniformly spread glue on the outer surface of the contact roller.

12. The device according to claim 11, wherein the two glue spreader rollers are equipped with independent drive means to open and close them; the drive means consisting of a vertical shaft to connect each said glue spreader rollers, each vertical shaft being equipped with a rod, perpendicular to it and acted upon by cam means which are in turn acted upon by the drive means in such a way as to open one of the spreader rollers and close the other and vice versa.

13. The device according to claim 12, wherein the two rods have spring means designed to keep them apart so as to keep the corresponding spreader rollers closed when the drive means are in the idle position.

14. The device according to claim 12, wherein the cam means consist of a tubular carriage within which the vertical shafts are partly housed, each said vertical shaft having a cam follower pin placed in contact with corresponding cam profiles made on a wall of the carriage so that, when the drive means, consisting of a pneumatic cylinder connected to the carriage are activated, one or other of the spreader rollers is opened.

15. The device according to claim 1 further comprising means for applying glue directly to the edge band.

16. The device according to claim 15, comprising a guide element, located close to the contact roller, said guide element consisting of a blade mounted on a rod which slides axially between an idle position, in which the blade is away from the contact roller and a working position in which the blade is close to the glue application means and opposes the edge band, on the side opposite that on which the glue is applied.

17. The device according to claim 1, wherein the first main pressure roller of the edge band is located downstream of the contact roller, relative to the direction in which the edge band is applied, can turn freely about its vertical axis and is linked to a first connecting-rod which is in turn pivoted at one end to the shaft forming the main axis; the first connecting-rod being connected to first means for pressing the first roller against the edge and at the same time adjusting the angular position of the first main pressure roller relative to the position of the contact roller in accordance with the profile of the edge of the panel and in such a way as to keep the first roller pressed against the edge band.

18. The device according to claim 17, wherein the means for pressing and adjusting the position of the first roller consist of the first connecting-rod with a pair of toothed wheels at each end, of which one is securely keyed to the shaft that forms the main axis; the toothed wheels having a first chain looped around them; there being, at one branch of the chain, first drive means connected to the first connecting-rod and acting on a first branch in such a way as to allow the first connecting-rod to turn in both directions according to the profile of the edge; said first connecting-rod also having a central arm extending transversally to the chain and rotatably mounting at its free end the first main roller.

19. The device according to claim 18, wherein the central arm is equipped with means that lock it in a fixed position in which the first main roller is away from the edge of the panel when a contact roller comes into contact with. the panel edge.

20. The device according to claim 19, wherein the locking means comprise a vertical pin connected with the central arm and which can move along its vertical axis between a lowered, idle position in which the central arm is able to move, allowing the first main roller to come into contact with the- edge, and a raised, working position in which the pin is in contact with a wall attached to a fixed structure of the device in such a way as to determine said fixed position; the fixed wall having a set screw that can be placed opposite the pin in order to vary the position in which the central arm stops relative to the set screw so as to adjust the distance between the first roller and the edge in the fixed position.

21. The device according to claim 18, wherein the first pressure roller can slide along the central arm so that its axis of rotation moves away from the main axis in order to prevent said first roller from jamming on the edge of the panel.

22. The device according to claim 21, wherein the first roller slides on a first guide and, at the top of it, has a cam profile that acts on a cam follower roller connected to an element used to regulate the pressure exerted by a first pressure means so as to adjust the position of the first roller and to reduce the pressure of the first.

23. The device according to claim 17, wherein on the ends of the shaft forming the main axis, corresponding first rubber rings designed to provide the shaft forming the main axis and the first roller with axial flexibility so that they can adjust to different shapes when they come into contact with the band applied to the edge.

24. The device according to claim 1, comprising means for feeding the edge band in the direction of the edge of the panel, located close to the contact roller and able to oscillate, together with the glue feed means about the main axis in accordance with the profile of the panel.

25. The device according to claim 24, wherein the edge band feed means and the glue feed means are equipped with means for adjusting their position by tilting them about the main axis according to the profile of the panel.

26. The device according to claim 25, wherein the adjustment means consist of the a structure that supports and covers the edge band feed means and the glue feed means and that is free to turn about the main axis, the top of the structure being equipped with a linear guide that is slidably coupled to a counter-guide made on a main mounting plate that is rotatable connected to the shaft forming the main axis; the main mounting plate comprising means that drive it and the supporting structure and that are designed to enable the main mounting plate and the supporting structure to tilt about the main axis in both directions.

27. The device according to claim 24, wherein the edge band feed means comprise a carriage designed to guide and carry the edge band close to the edge at the start of a work cycle and equipped with a fixed base and a pair of arms placed opposite the base in such a way as to form a channel for the passage of the edge band; there being a cylinder acting on the carriage, the cylinder being connected to a covering structure and designed to drive the carriage from a retracted, idle position to a forward, working position in which it carries the edge band close to the edge.

28. The device according to claim 27, wherein a stem of the cylinder is connected to the end of the arms, which is L-shaped and pivoted to the body of the carriage in such a way as to allow a portion of the edge band to be rotated to a stop position during the passage from the retracted to the forward position, under the thrusting action of the cylinder, and then to rotate the edge band to a released position in the opposite direction when it is applied to the edge, said release being effected by further moving forward only the carriage while keeping the stem fixed.

29. The device according to claim 24, wherein the edge band feed means comprise an arm that applies glue to the edge band, where H arm is equipped with a counter roller at its free end and a cylinder that drives it from an idle position, in which it is away from the contact roller and a working position in which it is close to the contact roller, with the edge band between the contact roller and the counter roller.

30. The device according to claim 24, wherein the means for feeding the edge band comprises, within a supporting and covering structure, at least one pair of motor-driven rollers used for loading the edge band and fitted opposite each other in such a way as to move the edge band towards the edge in a feed direction; there being means for detecting the passage of the edge band, located downstream of the pair of rollers relative to the feed direction and operating on related stop means located upstream of the pair of rollers relative to the feed direction and designed to stop the feeding of the edge band according to the position of the unit.

31. The device according to claim 30, wherein the two rollers that feed and load the edge band have corresponding kinematic elements which enable them to rotate in the feed direction independently of the direction of rotation of the contact roller.

32. The device according to claim 31, wherein the kinematic elements consist of a pair of first toothed wheels keyed to a single rotating shaft connected to the pair of feed rollers, said first toothed wheels being housed at the top of the covering structure of the edge band feed means; each of the two first toothed wheels meshing with corresponding second toothed wheels which are linked to drive elements of the device, are connected to the shaft forming the main axis, and are driven in opposite directions of rotation; each of the first toothed wheels being equipped with free wheel means designed to enable it to turn freely on the shaft of the main axis when the shaft forming the main axis turns in the direction opposite to its own.

33. The device according to claim 30, wherein the means for detecting the passage of the edge band consist at least one pair of optical units placed opposite each other.

34. The device according to claim 30, wherein the stop means consist of a presser element acting on a section of the edge band being fed and a straight wall against which the presser element presses the edge band to stop it.

35. The device according to claim 30, wherein the means for feeding the edge band comprise, downstream of the detecting means relative to the feed direction, an arm for guiding and spacing the edge band from a glue applicator roller, positioned parallel to the edge band and pivoted at one end to the supporting structure; the arm being equipped with drive means designed to allow the arm to rotate at least between two limit positions, of which one is an idle position when no edge band is detected and in which the arm is away from a guide wall of the edge band, and at least one working feed position in which the arm is close to the guide wall and in contact with the edge band being fed in such a way as to keep the latter on a defined feed line which does not interfere with the glue applicator roller.

36. The device according to claim 30, wherein the edge band feed means comprise means for heating the edge band located upstream of the stop means, relative to the feed direction, and designed to make the edge band more pliable when required.

37. The device according to claim 36, wherein the heating means comprise one or more short-wave infrared ray emitting units positioned parallel to each other and transversal to the direction of feed.

38. The device according to claim 24, wherein the edge band feed means comprise means for detecting the length of the edge band and cutting off the edge band when it has gone right around the panel to join a starting end that was applied first.

39. The device according to claim 38, wherein the detecting means consist of a rod pivoted to a covering structure and designed to rotate between an idle position in which it is withdrawn inside the covering structure, and a working position in which it protrudes from the covering structure when necessary and is positioned close to the edge, with a part in contact with the lower surface of the panel to be edge banded; the rod being equipped with presence sensors located opposite each other and designed to detect the starting end of the edge band and to send a signal to the control unit which processes a signal and activates a cutoff unit located close to the channel for the passage of the edge band. roller on the edge when the first main pressure roller moves away from the main axis; means being envisaged to act on the first pressure means so as to restore initial working conditions.

40. The device according to claim 39, wherein the cutoff unit consists of a circular cutter mounted on a base that is slidably connected to the covering structure and linked to a drive cylinder.

41. The device according to claim 1, comprising a secondary pressure roller located downstream of the first, main roller relative to a direction in which the edge band is applied and linked to a second connecting-rod pivoted at one end to a first shaft connected to a first central arm mounting the first main roller and forming a pivot point of the secondary roller; there being secondary pressure means acting on the second roller and used to adjust its position relative to the first roller in accordance with the profile of the panel so that it remains in contact with the edge band.

42. The device according to claim 41, wherein the second pressure and adjustment means consist of the second connecting-rod having, on the ends of it, corresponding second toothed wheels around which a second chain is looped; one of the second toothed wheel being securely keyed to the first shaft and, at the other toothed wheel, there being second means for driving the second connecting-rod, acting on the second chain and designed to turn the second pressure roller relative to the position of the first roller in both directions, in accordance with the profile of the edge and in such a way as to keep the second pressure roller in contact with the edge.

43. The device according to claim 42, wherein the second pressure roller slides along the central arm so that its axis of rotation moves away from the main axis and the first pressure roller in order to prevent said second pressure roller from jamming on the edge of the panel.

44. The device according to claim 43, wherein the second pressure roller slides on a second guide located on the central arm and, at the top of it, has a cam profile that acts on a cam follower roller connected to regulator valve means used to reduce the pressure exerted by second pressure means acting on the second roller in such a way as to reduce its pressure on the edge; spring means acting between the second pressure roller and the central arm in order to restore initial working conditions.

45. The device according to claim 41, wherein the second pressure roller is mounted in such a way that it can turn freely on a second shaft mounted on the second connecting-rod; there being, on the ends of the second shaft, corresponding second rubber rings, said second rubber rings being designed to provide the second shaft and the secondary pressure roller with axial flexibility so that they can adjust to different shapes when they come into contact with the band applied to the edge.

46. The device according to claim 45, wherein the first and second shafts are rigidly connected to each other at their lower ends by a single supporting element having a vertical column connected to the second connecting-rod.

* * * * *